United States Patent
Gomita

(10) Patent No.: US 12,008,782 B2
(45) Date of Patent: Jun. 11, 2024

(54) INFORMATION PROCESSING APPARATUS, INFORMATION PROCESSING METHOD, AND PROGRAM

(71) Applicant: SONY GROUP CORPORATION, Tokyo (JP)

(72) Inventor: Jun Gomita, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 365 days.

(21) Appl. No.: 17/433,145

(22) PCT Filed: Mar. 12, 2020

(86) PCT No.: PCT/JP2020/010734
§ 371 (c)(1),
(2) Date: Aug. 23, 2021

(87) PCT Pub. No.: WO2020/195875
PCT Pub. Date: Oct. 1, 2020

(65) Prior Publication Data
US 2022/0198697 A1    Jun. 23, 2022

(30) Foreign Application Priority Data
Mar. 27, 2019 (JP) ................. 2019-060706

(51) Int. Cl.
*G06T 7/70* (2017.01)
*G06T 7/00* (2017.01)
*G06T 7/60* (2017.01)

(52) U.S. Cl.
CPC ................. *G06T 7/70* (2017.01); *G06T 7/60* (2013.01); *G06T 7/97* (2017.01)

(58) Field of Classification Search
CPC ................. G06T 7/70; G06T 7/97; G06T 7/60
See application file for complete search history.

(56) References Cited

U.S. PATENT DOCUMENTS 8,139,821 B2 * 3/2012 Aimura ................. G06V 20/58
382/104
10,445,896 B1 * 10/2019 Bills ..................... G01B 11/24
(Continued)

FOREIGN PATENT DOCUMENTS

| JP | H06-185991 A | 7/1994 |
| JP | 2008-128983 A | 6/2008 |

(Continued)

OTHER PUBLICATIONS

Asl et al., 2019, "Integration of the inertial navigation system with consecutive images of a camera by relative position and attitude updating", (pp. 5592-5605) (Year: 2019).*

*Primary Examiner* — Manav Seth
(74) *Attorney, Agent, or Firm* — Paratus Law Group, PLLC

(57) ABSTRACT

An information processing apparatus according to an embodiment of the present technology includes an output control unit. The output control unit outputs distance information based on an actual distance between a first target object imaged by a first imaging device and a second target object imaged by a second imaging device on the basis of scale information regarding the actual distance, first position information regarding a position and an attitude of the first imaging device, and second position information regarding a position and an attitude of the second imaging device. Accordingly, a distance between two target objects can be easily and accurately measured.

20 Claims, 13 Drawing Sheets

(56) References Cited

U.S. PATENT DOCUMENTS

| | | | |
|---|---|---|---|
| 10,591,292 B2* | 3/2020 | Zhu | G08G 5/0082 |
| 10,997,435 B2* | 5/2021 | Abbott | G06V 20/58 |
| 11,004,228 B2* | 5/2021 | Oswald | G06T 7/60 |
| 11,138,712 B2* | 10/2021 | Frei | G06V 10/255 |
| 11,392,146 B2* | 7/2022 | Wei | G06T 7/11 |
| 11,394,950 B2* | 7/2022 | Li | H04N 13/111 |
| 11,645,762 B2* | 5/2023 | Pokhrel | G05D 1/106 |
| | | | 382/103 |
| 11,668,571 B2* | 6/2023 | Derhy | G06T 7/73 |
| | | | 701/500 |
| 2017/0352160 A1* | 12/2017 | Tanaka | G06F 3/012 |
| 2017/0355453 A1* | 12/2017 | Kim | G05D 1/0676 |
| 2018/0259652 A1* | 9/2018 | Shimizu | G06T 7/70 |
| 2020/0027234 A1* | 1/2020 | Kasahara | G01C 3/085 |

FOREIGN PATENT DOCUMENTS

| | | |
|---|---|---|
| JP | 2012-080193 A | 4/2012 |
| JP | 2016-045874 A | 4/2016 |
| JP | 2018-048839 A | 3/2018 |
| WO | WO 2018/015716 A | 1/2018 |

\* cited by examiner

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2020/010734 (filed on Mar. 12, 2020) under 35 U.S.C. § 371, which claims priority to Japanese Patent Application No. 2019-060706 (filed on Mar. 27, 2019), which are all hereby incorporated by reference in their entirety.

TECHNICAL FIELD

The present technology relates to an information processing apparatus, an information processing method, and a program that can be applied to modeling and the like of the real world.

BACKGROUND ART

Conventionally, simultaneous localization and mapping (SLAM) has been known as a self-position estimation technology of estimating a position and an attitude of a portable terminal such as a smartphone, a wearable terminal such as a head-mounted display, or the like. The SLAM is a technology of simultaneously performing estimation of a self-position and generation of an environment map, and is often used as a technology for realizing augmented reality (AR) and virtual reality (VR). For example, Patent Literature 1 has disclosed a technology capable of performing self-position estimation with high robustness.

CITATION LIST

Patent Literature

Patent Literature 1: Japanese Patent Application Laid-open No. 2016-45874

DISCLOSURE OF INVENTION

Technical Problem

The real world can be modeled by using the technology such as the SLAM. For example, it is desirable to provide a technology by which a distance between two target objects such as a width of a passageway can be easily and accurately measured by using a portable terminal such as a smartphone.

In view of the above-mentioned circumstances, it is an object of the present technology to provide an information processing apparatus, an information processing method, and a program by which a distance between two target objects can be easily and accurately measured.

Solution to Problem

In order to accomplish the above-mentioned object, an information processing apparatus according to an embodiment of the present technology includes an output control unit.

The output control unit outputs distance information based on an actual distance between a first target object imaged by a first imaging device and a second target object imaged by a second imaging device on the basis of scale information regarding the actual distance, first position information regarding a position and an attitude of the first imaging device, and second position information regarding a position and an attitude of the second imaging device.

In this information processing apparatus, the distance information based on the actual distance between the first target object imaged by the first imaging device and the second target object imaged by the second imaging device is generated on the basis of the scale information, the first position information of the first imaging device, and the second position information of the second imaging device. Accordingly, the distance between the first target object and the second target object can be easily and accurately measured.

The first imaging device and the second imaging device may be arranged to be in a predetermined positional relationship. In this case, the output control unit may output the distance information on the basis of information regarding a positional relationship between the first imaging device and the second imaging device.

The first imaging device may be configured to have a first direction as an imaging direction. In this case, the second imaging device may be configured to have a second direction different from the first direction as an imaging direction.

The first direction and the second direction may be set such that an angle of intersection falls within a range of 90° to 180°.

The first position information may be calculated on the basis of an image of the first target object imaged by the first imaging device. In this case, the second position information may be calculated on the basis of an image of the second target object imaged by the second imaging device.

The scale information may be acquired on the basis of a detection result of a motion sensor arranged to be in a predetermined positional relationship with at least one of the first imaging device or the second imaging device.

The output control unit may calculate at least one of the first position information or the second position information on the basis of the detection result of the motion sensor.

The scale information may be acquired on the basis of an image obtained by imaging, by at least one of the first imaging device or the second imaging device, a known target object with which information regarding an actual distance is associated.

The scale information may be acquired on the basis of a detection result of a distance measurement sensor arranged to be in a predetermined positional relationship with at least one of the first imaging device or the second imaging device.

The output control unit may calculate at least one of the first position information or the second position information on the basis of the detection result of the distance measurement sensor.

The first imaging device may include at least one configuration of the digital camera or a time of flight (ToF) sensor. In this case, the second imaging device may include at least one configuration of a digital camera or a ToF sensor.

The first target object and the second target object may be wall surfaces arranged across a passageway. In this case, the distance information may include a width of the passageway.

The information processing apparatus may further include: a first surface; a second surface on a side opposite to the first surface; the first imaging device disposed toward a surface side of the first surface; and the second imaging device disposed toward a surface side of the second surface. In this case, the information processing apparatus may be configured as a portable terminal portable by a user.

The information processing apparatus may further include a device information acquisition unit that acquires information regarding a device mounted on the portable terminal. In this case, the output control unit may output the distance information on the basis of the information regarding the device.

The output control unit may perform modeling of the first target object and the second target object on the basis of the scale information, the first position information, and the second position information, to thereby output the distance information.

The output control unit may perform SLAM on the basis of an image of a first target object imaged by the first imaging device and an image of a second target object imaged by the second imaging device, to thereby output the distance information.

The information processing apparatus may further include a notification unit that determines whether or not it is a situation disadvantageous to output of the distance information, and notifies, in a case where it is determined that it is the situation disadvantageous to the output of the distance information, a user of the fact.

The notification unit may notify of information for overcoming the disadvantageous situation in a case where it is the situation disadvantageous to the output of the distance information.

An information processing method according to an embodiment of the present technology is an information processing method performed by a computer system, including: outputting distance information based on an actual distance between a first target object imaged by a first imaging device and a second target object imaged by a second imaging device on the basis of scale information regarding the actual distance, first position information regarding a position and an attitude of the first imaging device, and second position information regarding a position and an attitude of the second imaging device.

A program according to an embodiment of the present technology causes a computer system to execute the following step.

A step of outputting distance information based on an actual distance between a first target object imaged by a first imaging device and a second target object imaged by a second imaging device on the basis of scale information regarding the actual distance, first position information regarding a position and an attitude of the first imaging device, and second position information regarding a position and an attitude of the second imaging device.

MODE(S) FOR CARRYING OUT THE INVENTION

Hereinafter, embodiments according to the present technology will be described with reference to the drawings.

Outline of Present Technology

Figure 1:
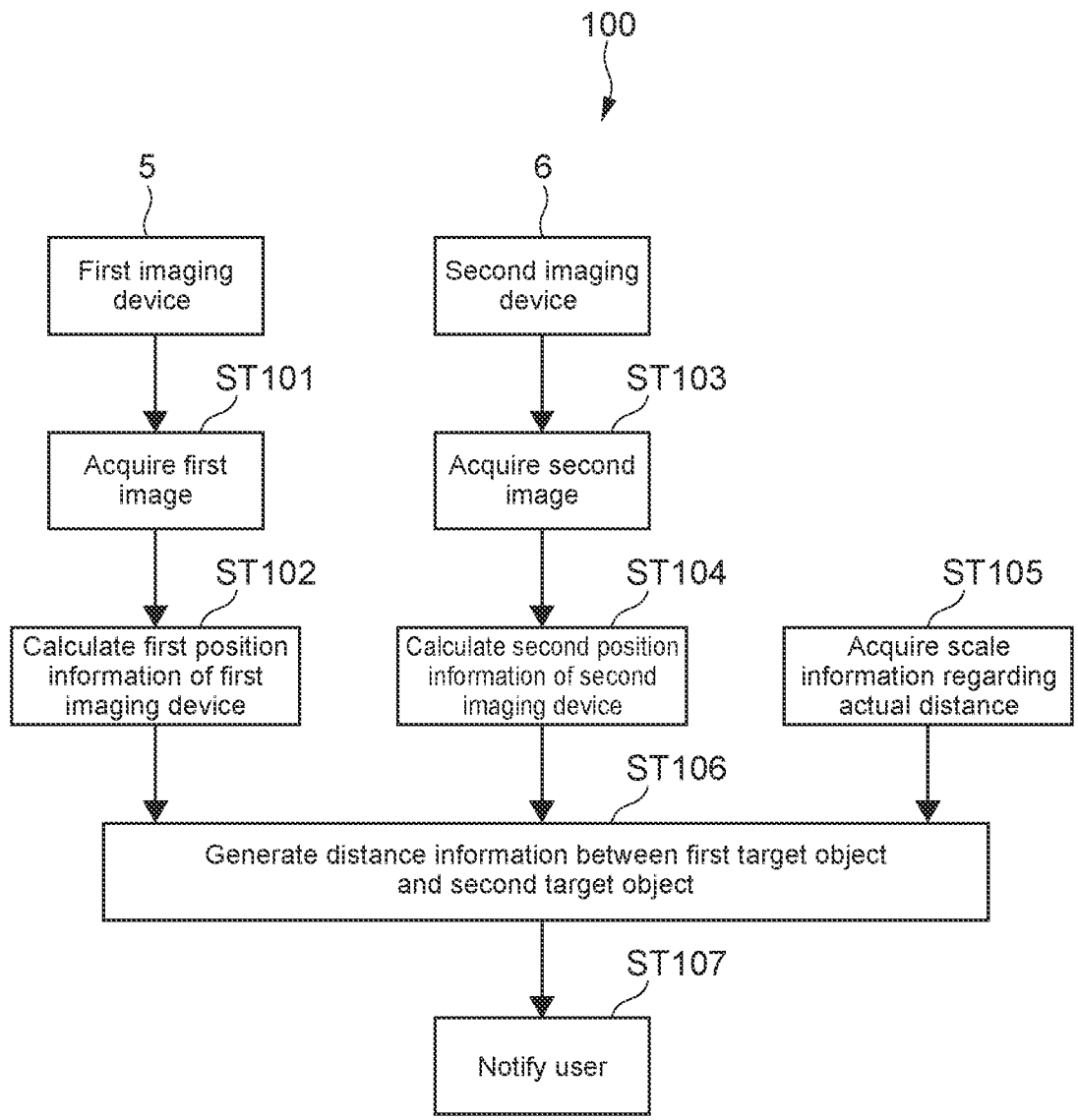
FIG. 1 A schematic diagram for describing the outline of an information processing system according to the present technology.

FIG. 1 is a schematic diagram for describing the outline of an information processing system according to the present technology. Here, a distance information generation system 100 will be exemplified as an embodiment of the information processing system. The distance information generation system 100 includes a first imaging device 5 and a second imaging device 6.

In the present disclosure, an imaging device includes any device having a light receiving element that receives light and capable of generating an image including an image of a target object. For example, a digital camera including an image sensor such as a complementary metal-oxide semiconductor (CMOS) sensor or a charge coupled device (CCD) sensor can be used as the imaging device.

Moreover, a time of flight (ToF) camera or the like capable of acquiring a distance (depth) to a target object may be used as the imaging device. Alternatively, a stereo camera, a monocular camera, an infrared camera, a polarization camera, or the like may be used.

That is, devices including at least one configuration of the digital camera or the ToF sensor can be employed as the first imaging device 5 and the second imaging device 6 according to the present technology. The present technology is not limited to the case where the first imaging device 5 and the second imaging device 6 have the same configuration. The first imaging device 5 and the second imaging device 6 may have different configurations.

Moreover, the image includes a still image and a moving image. As a matter of course, a plurality of frame images included in the moving image is also included in the image. In the following description, imaging a target object by the imaging device and generating an image of the target object will be sometimes referred to as capturing an image of the target object.

A target object imaged by the first imaging device 5 shown in FIG. 1 is defined as a first target object. Moreover, a target object imaged by the second imaging device 6 is defined as a second target object.

Typically, the first imaging device 5 is configured to have a first direction as the direction. The second imaging device 6 is configured to have a second direction different from the first direction as the imaging direction. Therefore, the first target object imaged by the first imaging device 5 is a target to be imaged different from the second target object imaged by the second imaging device 6.

The first direction and the second direction are respectively set to be directions different by 180°, for example. Therefore, the first imaging device 5 and the second imaging device 6 are mounted oriented in directions opposite to each other. As a matter of course, the present technology is not limited to such a direction setting, an angle of intersection of the first direction and the second direction may be set to an angle different from 180°. This point will be described again later.

As shown in FIG. 1, an image of a first target object (hereinafter, referred to as first image) captured by the first imaging device 5 is acquired (Step 101). First position information of the first imaging device is calculated on the basis of the acquired first image in Step 102.

Moreover, an image of the second target object (hereinafter, referred to as second image) captured by the second imaging device 6 is acquired (Step 103). Second position information of the second imaging device is calculated on the basis of the acquired second image (Step 104)

In the present disclosure, the position information means information regarding a position and an attitude. For example, only information regarding the position can be calculated as the position information or only the information regarding the attitude can be calculated. As a matter of course, information including both the information regarding the position and the information regarding the attitude may be calculated. Additionally, arbitrary information regarding the position and the attitude, such as changes in position and attitude, may be calculated as the position information.

For example, in Step 102, a position and an attitude of the first imaging device 5 relative to the first target object are calculated. In Step 104, a position and an attitude of the second imaging device 6 relative to the second target object are calculated.

For example, an XYZ coordinate system is set by using the first imaging device 5 as a reference, and it is possible to calculate information regarding the position of the first imaging device 5 relative to the first target object by using the xyz coordinate values in the coordinate system.

Similarly, an XYZ coordinate system is set by using the second imaging device 6 as a reference, and it is possible to calculate information regarding the position of the second imaging device 6 relative to the second target object by using xyz coordinate values in the coordinate system.

For example, the SLAM may be performed on the basis of a moving image (plurality of frame images) of the first target object, and estimation of a self-position of the first imaging device 5 and generation of an environment map may be performed. In this case, the estimation result of the self-position and the generated environment map are included in the position information according to the present technology.

Similarly, the SLAM may be performed on the basis of the moving image (plurality of frame images) of the second target object, and estimation of a self-position of the second imaging device 6 and generation of an environment map may be performed. In this case, the estimation result of the self-position and the generated environment map are included in the position information according to the present technology.

A method of generating the first position information on the basis of the first image and a method of generating the second position information on the basis of the second image are not limited, and any algorithm may be employed. Any machine learning algorithm using a deep neural network (DNN), for example, may be used. For example, the use of artificial intelligence (AI) or the like for performing deep learning can improve the calculation accuracy of the first position information and the second position information.

Moreover, in the distance information generation system, scale information regarding an actual distance is acquired as shown in FIG. 1 (Step 105). The scale information regarding the actual distance includes any information with which information based on the actual distance can be output on the basis of the first position information and the second position information calculated in Steps 102 and 104, for example.

For example, it includes any information by which the position and the attitude of the first imaging device 5 represented by the coordinate values in the XYZ coordinate system set by using the first imaging device 5 as the reference can be output as the information based on the actual distance.

Similarly, it includes any information by which the position and the attitude of the second imaging device 6 represented by the coordinate values in the XYZ coordinate system set by using the second imaging device 6 as the reference can be output as the information based on the actual distance. Additionally, it includes any information regarding the physical scale of the real world.

A method of acquiring the scale information is not limited, and any method may be employed. Examples of the method of acquiring the scale information can include a method using a motion sensor, a method using a known target object whose size and the like are known in advance, a method using a distance measurement sensor such as the ToF sensor, and the like. As a matter of course, other methods may be used.

As shown in FIG. 1, distance information based on the actual distance between the first target object and the second target object is generated on the basis of the first position information calculated in Step 102, the second position information calculated in Step 104, and the scale information acquired in Step 105 (Step 106).

As used herein, the term "distance information" includes any information regarding the distance between the first target object and the second target object. For example, the term "distance information" includes a distance from the first target object to the first imaging device 5, a distance from the second target object to the second imaging device 6, a distance from the first target object to the second target object, and the like. Moreover, the term "distance information" may include any information such as statistical information of a maximum value, a minimum value, a distribution, and the like of the distance from the first target object to the second target object or the like. Moreover, the wording "on the basis of the actual distance" means information that can be expressed as the actual distance calculated on the basis of the acquired scale information.

For example, the distance information may be generated by performing the SLAM on the first image and the second image. That is, modeling of the first target object and the second target object may be performed on the basis of the scale information, the first position information, and the second position information. The distance information may be generated on the basis of the modeling result. Accordingly, it is possible to generate detailed information regarding the shape related to a space sandwiched between the first target object and the second target object and the like, for example.

For example, in a case where a passageway is configured between the first target object and the second target object, it is possible to easily and accurately generate information regarding a width, a shape, and the like of the passageway.

The method and the like for generating and outputting the distance information are not limited, and any algorithm or the like may be used. Alternatively, machine learning or the like may be performed.

As shown in FIG. 1, the distance information generated in Step 106 is notified to the user (Step 107). The notification method is not limited, and display on a display, voice notification, or the like is performed, for example.

<Example of Application to Measurement of Passageway Width>

Figure 2:
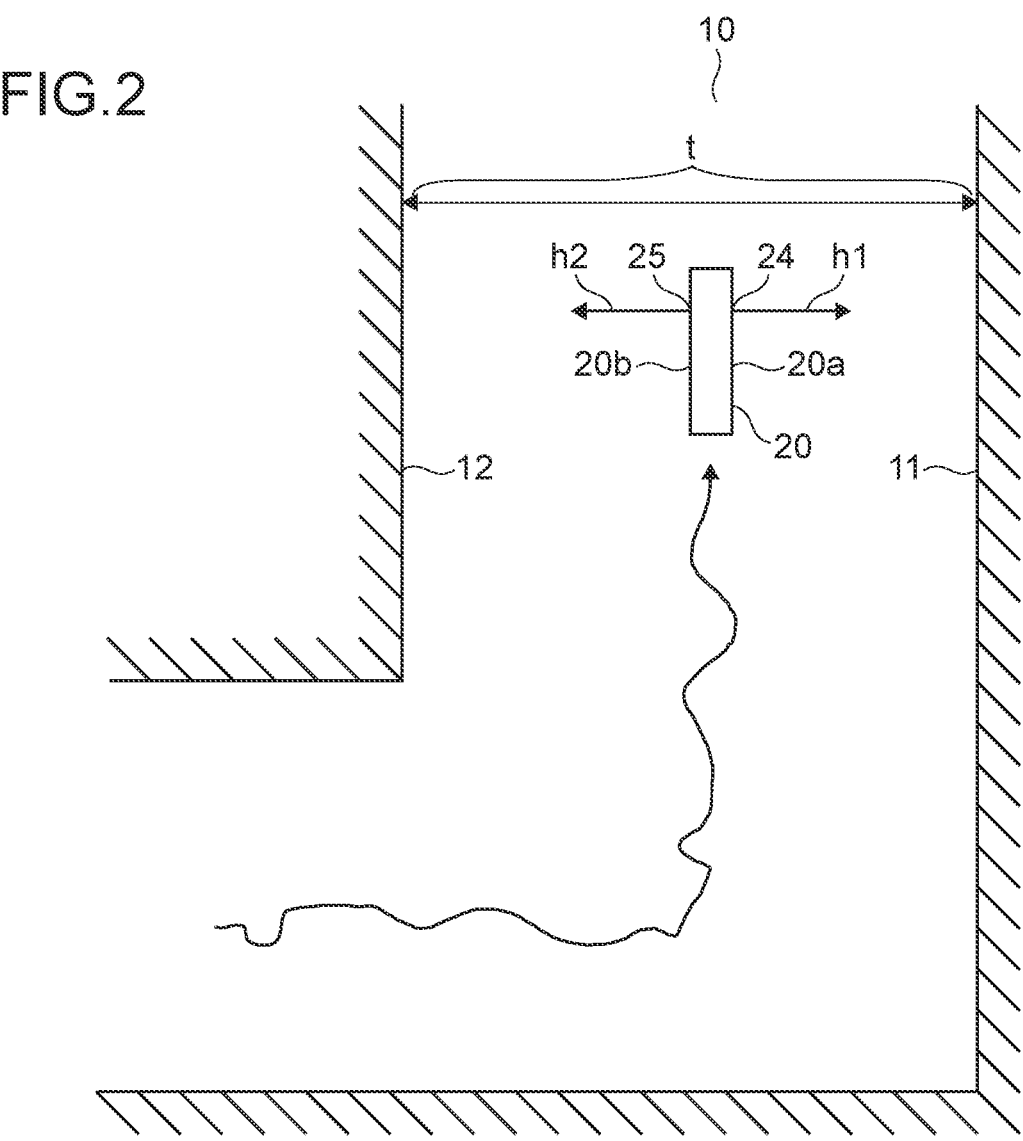
FIG. 2 A schematic diagram for describing an application example of a distance information generation system according to the present technology.
Figure 3:
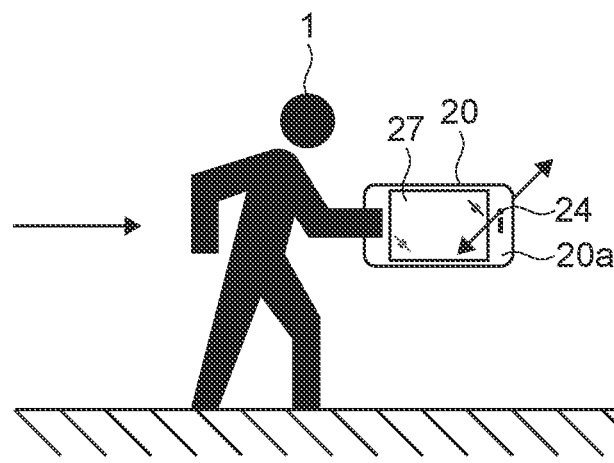
FIG. 3 A schematic diagram for describing an application example of the distance information generation system according to the present technology.

FIGS. 2 and 3 are schematic diagrams for describing an example of application of the distance information generation system according to the present technology. Here, a case where the present technology is applied to measurement of a width t of a passageway 10 will be described.

As shown in FIGS. 2 and 3, a user 1 uses a portable terminal 20 including a front-facing camera 24 and a rear-facing camera 25. For example, an application program according to the present technology is started. Then, notification information for notifying of a method for measuring the width t of the passageway 10 is displayed on a touch panel 27 configured on a main surface 20a side of the portable terminal 20.

For example, as illustrated in FIGS. 2 and 3, an instruction to hold the portable terminal 20 is notified such that the front-facing camera 24 and the rear-facing camera 25 faces a first wall surface 11 and a second wall surface 12 disposed across the passageway 10, respectively. Then, an instruction to move through the center of the passageway 10 while holding the portable terminal 20 is notified.

The correspondence between each element described with reference to FIG. 1 and each element in the example of FIGS. 2 and 3 will now be described below.

Front-facing camera 24 . . . first imaging device 5
Rear-facing camera 25 . . . second imaging device 6
Imaging direction (arrow h1) of front-facing camera 24 . . . first direction
Imaging direction (arrow h2) of rear-facing camera 25 . . . second direction
First wall surface 11 . . . first target object
Second wall surface 12 . . . second target object It should be noted that in this embodiment, the front-facing camera 24 corresponds to the first imaging device 5 and the rear-facing camera 25 corresponds to the second imaging device 6. As a matter of course, the present technology is not limited to such correspondence, and the opposite correspondence is also possible.

The portable terminal 20 portable by the user 1 is used as an embodiment of an information processing apparatus according to the present technology. The main surface 20a of the portable terminal 20 corresponds to a first surface and a back surface 20b on the opposite side to the main surface 20a corresponds to a second surface. The front-facing camera 24 is disposed toward a surface side of the main surface 20a and the rear-facing camera 25 is configured toward a surface side of the back surface 20b. Therefore, the angle of intersection between the imaging direction of the front-facing camera 24 and the imaging direction of the rear-facing camera 25 is 180°.

The portable terminal 20 performs each step illustrated in FIG. 1 and calculates distance information based on the actual distance between the first wall surface 11 and the second wall surface 12. For example, in a case where the SLAM or the like is performed, it is possible to model the first wall surface 11 and the second wall surface 12 with high accuracy even if the attitude (orientation) of the portable terminal 20 is inclined with respect to the extending direction of the passageway as illustrated in FIG. 2. As a result, it is possible to generate the distance information including the width and the like of the passageway 10 with high accuracy.

The generated distance information is displayed on a display unit 28 as information in a simple 3D map obtained by modeling the entire passageway, for example. As the display method, it is conceivable to perform display in such a manner that the color is changed in accordance with the size of a road width on the basis of the distance information or to perform display in such a manner that a portion of a road width having a value smaller than a path width specified by a user is emphasized with a color or a character. In this case, it is possible to visualize the degree of risk in carrying in the entire route map.

Additionally, during measurement using the portable terminal 20, the road width of the point where the user is currently present may be displayed as a numerical value or the numerical value may be output as audio information in real time. Moreover, it is also possible to perform notification by sound in a case where the path width is less than a path width specified by the user.

Hereinafter, some examples of generation of the distance information according to the present technology will be described focusing on exemplary variations of the method of acquiring the scale information shown in Step 105 of FIG. 1. Specifically, the method using the motion sensor, the method using the known target object whose size and the like are known in advance, and the method using the distance measurement device such as the ToF sensor will be described in order as the method of acquiring the distance information.

<Method Using Motion Sensor>

Figure 4:
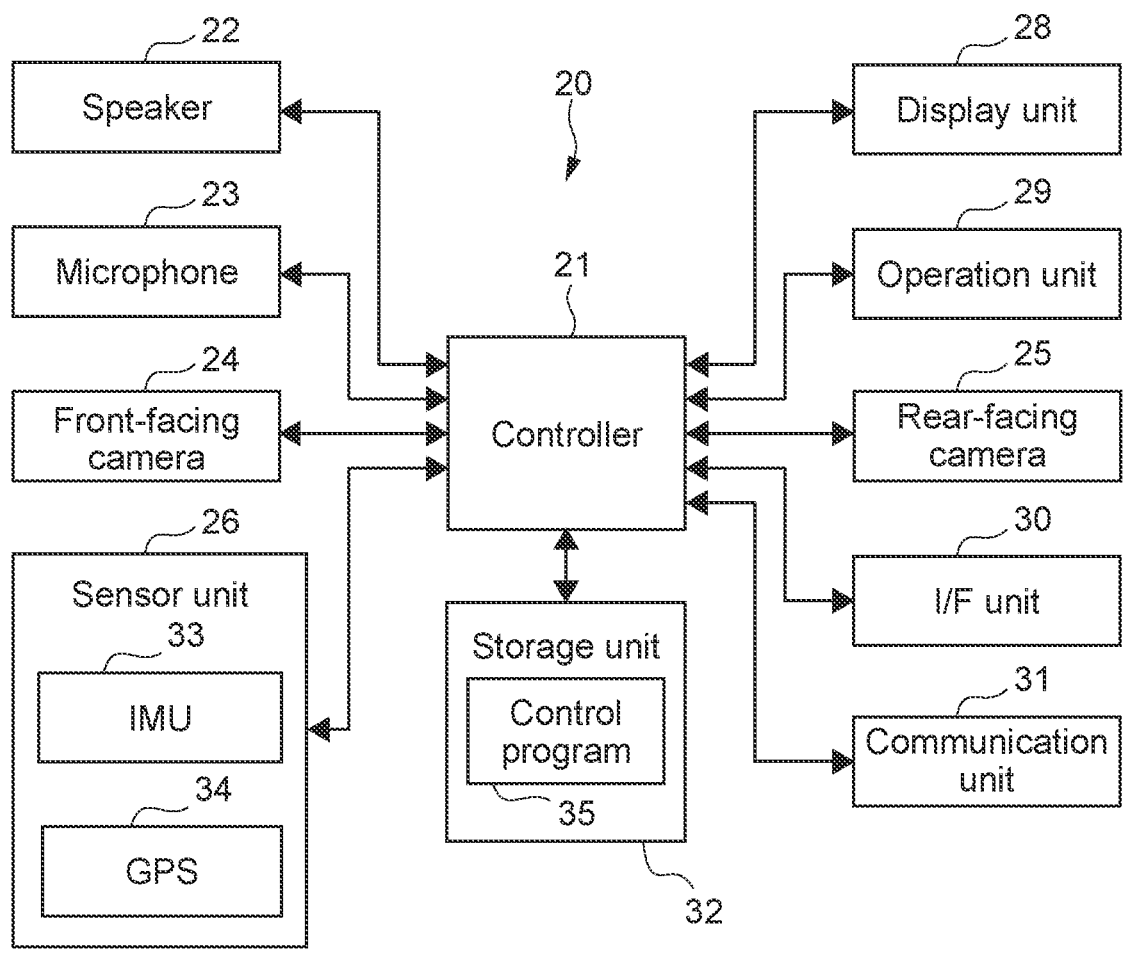
FIG. 4 A schematic block diagram showing a configuration example of a portable terminal.

FIG. 4 is a schematic block diagram showing a configuration example of the portable terminal 20. The portable terminal 20 includes a controller 21, a speaker 22, a microphone 23, the front-facing camera 24, the rear-facing camera 25, and a sensor unit 26. Moreover, the portable terminal 20 includes the display unit 28, an operation unit 29, an interface (I/F) unit 30, a communication unit 31, and a storage unit 32.

The speaker 22 is capable of outputting various sounds. The specific configuration of the speaker 22 is not limited.

The microphone 23 is capable of acquiring sounds generated in the periphery. For example, the microphone 23 is capable of detecting and acquiring a voice uttered by the user or ambient environmental sounds. The specific configuration of the microphone 23 is not limited.

The display unit 28 is a display device using, for example, liquid crystal, electro-luminescence (EL), or the like, and displays various images, various graphical user interfaces (GUIs), and the like. Examples of the operation unit 29 include a keyboard, a pointing device, and other operation devices.

As shown in FIG. 3, in this embodiment, the touch panel 27 is disposed on the main surface 20a of the portable terminal 20. The touch panel 27 is a device having both functions of the display unit 28 and the operation unit 29 shown in FIG. 3.

The front-facing camera 24 is disposed on the main surface 20*a* side of the portable terminal 20. The front-facing camera 24 is capable of capturing a space of the main surface 20*a* side as viewed from the portable terminal 20 and generating its image (image data).

The rear-facing camera 25 is disposed on the back surface 20*b* side of the portable terminal 20. The rear-facing camera 25 is capable of imaging a space on the back surface 20*b* side as viewed from the portable terminal 20 and generating the image (image data).

The front-facing camera 24 and the rear-facing camera 25 enable images of the first wall surface 11 and the second wall surface 12 to be imaged simultaneously and in accordance with a common time series.

The sensor unit 26 includes an inertial measurement unit (IMU) 33 and a GPS 34. The IMU 33 is a type of motion sensors and is capable of detecting acceleration and angular velocity in three axes. The specific configuration of the IMU 33 is not limited, and any configuration including a gyroscopic sensor, an accelerometer, a compass sensor, and the like may be employed. A 6-axis IMU may be used or a 9-axis IMU may be used as the IMU 33.

The IMU 33 is capable of calculating the acceleration and angular velocity on the basis of the actual distance. That is, changes in position and attitude of the portable terminal 20 and the like can be detected on the basis of the actual distances on the basis of the detection result of the IMU 33.

In this embodiment, the scale information regarding the actual distance can be acquired on the basis of the detection result of the IMU 33. Specifically, position information regarding the position and the attitude of the portable terminal 20 detected by the IMU 33 is used as the scale information. Hereinafter, the scale information regarding the actual distance will be referred to as the physical scale.

As described above, the IMU 33 is used as the motion sensor in this embodiment. An example in which the scale information is acquired on the basis of the detection result of the IMU 33 will be described as an example in which the scale information is acquired on the basis of the detection result of the motion sensor.

As a matter of course, the type of motion sensor is not limited to the IMU. Any sensor capable of detecting the movement of the portable terminal 20 may be used. For example, any sensor capable of detecting acceleration, angular velocity, direction, and the like of the portable terminal 20 on the basis of the actual distance can be used. For example, a gyroscopic sensor, an accelerometer, a compass sensor, or the like constituting the IMU may be used alone as the motion sensor according to the present technology. The scale information can be obtained even in a case where the motion sensor other than the IMU is used.

The GPS 34 is capable of outputting the position information of the portable terminal 20. The specific configuration of the GPS 34 is not limited, and any configuration may be employed.

It should be noted that the type of sensor provided as the sensor unit 26 is not limited, and any sensor may be provided. For example, a biological sensor or the like capable of detecting the body temperature, the pulse rate, and the like of the user 1 may be provided. Additionally, a temperature sensor, a humidity sensor, or the like capable of measuring temperature, humidity, or the like of the surrounding environment may be provided. It should be noted that the microphone 23, the front-facing camera 24, and the rear-facing camera 25 shown in FIG. 4 may function as the sensor unit 26.

The I/F unit 30 is an interface to which other devices such as a universal serial bus (USB) terminal and a high-definition multimedia interface (HDMI (registered trademark)) terminal and various cables are connected.

The communication unit 31 is a communication module for communicating with another device, and, for example, a wireless local area network (LAN) module such as Wi-Fi or a communication module for short-range wireless communication such as Bluetooth (registered trademark) is used.

The storage unit 32 is a nonvolatile storage device, and, for example, a hard disk drive (HDD), a solid state drive (SSD), or the like is used.

The storage unit 32 stores a control program 35 for controlling the entire operation of the portable terminal 20. A method of installing the control program 35 to the portable terminal 20 is not limited. For example, installation may be performed via various recording media or installation of the program may be performed via the Internet or the like.

It should be noted that the type and the like of the recording medium on which the program according to the present technology is recorded are not limited, and any recording medium which can be read by a computer may be used. For example, any recording medium that records data non-temporarily may be used.

The controller 21 controls the operation of each block included in the portable terminal 20. The controller 21 includes hardware necessary for the configuration of the computer such as a CPU (processor), a ROM, a RAM, and an HDD, for example. The CPU loads a program according to the present technology (e.g., application program) which is recorded in advance in the ROM or the like into the RAM and executes the program to thereby perform an information processing method according to the present technology.

The specific configuration of the controller 21 is not limited, and, for example, any hardware such as a GPU, a field programmable gate array (FPGA), and an application specific integrated circuit (ASIC) may be used.

The portable terminal 20 can be realized by, for example, a smartphone, a tablet terminal, a wearable device, a sensor device, or the like. As a matter of course, the present technology is not limited thereto, and any computer device may be used.

Figure 5:
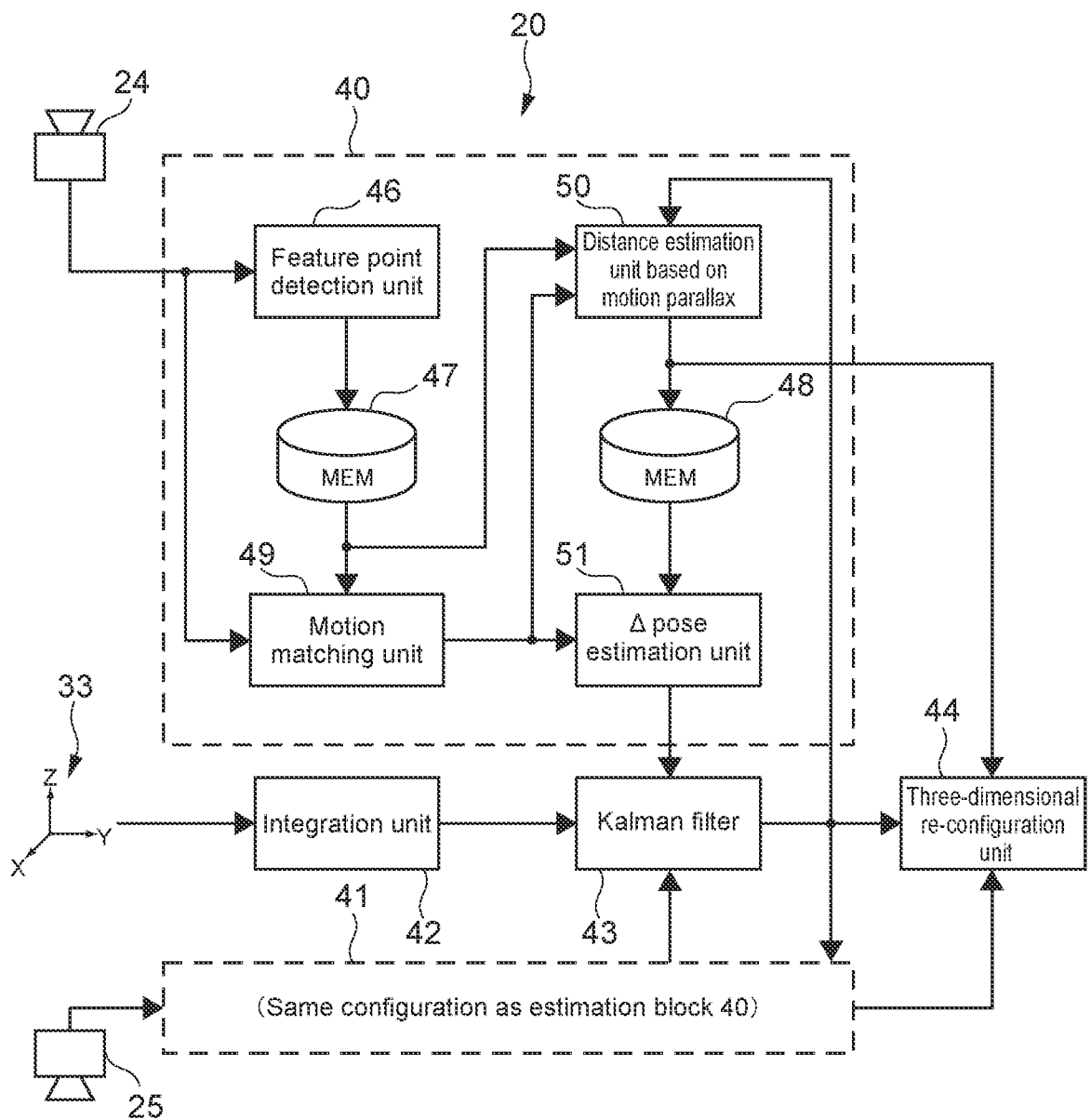
FIG. 5 A schematic block diagram showing an example of a software configuration of the portable terminal.

FIG. 5 is a schematic block diagram showing an example of a software configuration of the portable terminal 20.

The CPU of the controller 21 executes the program according to this embodiment (e.g., application program) to thereby realize estimation blocks 40 and 41, an integration unit 42, a Kalman filter 43, and a three-dimensional reconstruction unit 44 as functional blocks. The information processing method according to this embodiment is performed by those functional blocks. It should be noted that dedicated hardware such as an integrated circuit (IC) may be used as appropriate in order to realize each functional block.

The estimation block 40 includes a feature point detection unit 46, memory units 47 and 48, a motion matching unit 49, a distance estimation unit 50, and a Δ pose estimation unit 51. The estimation block 41 has the same configuration as the estimation block 40.

It should be noted that the front-facing camera 24 and the rear-facing camera 25 are arranged inside the portable terminal 20 to be in a predetermined positional relationship. Moreover, the IMU 33 is also arranged to be in a predetermined positional relationship with the front-facing camera 24 and the rear-facing camera 25. For example, the position and the attitude of the front-facing camera 24, the rear-facing camera 25, and the IMU 33 change in conjunction with changes in position and attitude of the portable terminal 20 itself.

It is also possible to calculate distance information on the basis of information regarding the positional relationship between the front-facing camera 24 and the rear-facing camera 25, such as offsets of the position and the attitude of the front-facing camera 24 and the rear-facing camera 25, for example. Accordingly, it is possible to improve the accuracy of the distance information.

On the other hand, it is also possible to apply the present technology to generate and output distance information, considering that the front-facing camera 24 and the rear-facing camera 25 are at the same position, i.e., without considering the offsets of the position and the attitude. Accordingly, it is possible to simplify the processing and shorten the processing time.

Also regarding the IMU 33, distance information may be similarly calculated on the basis of information regarding offsets of the position and the attitude between the front-facing camera 24, the rear-facing camera 25, and the IMU 33. On the other hand, it is also possible to calculate the distance information without considering the offsets.

Figure 6:
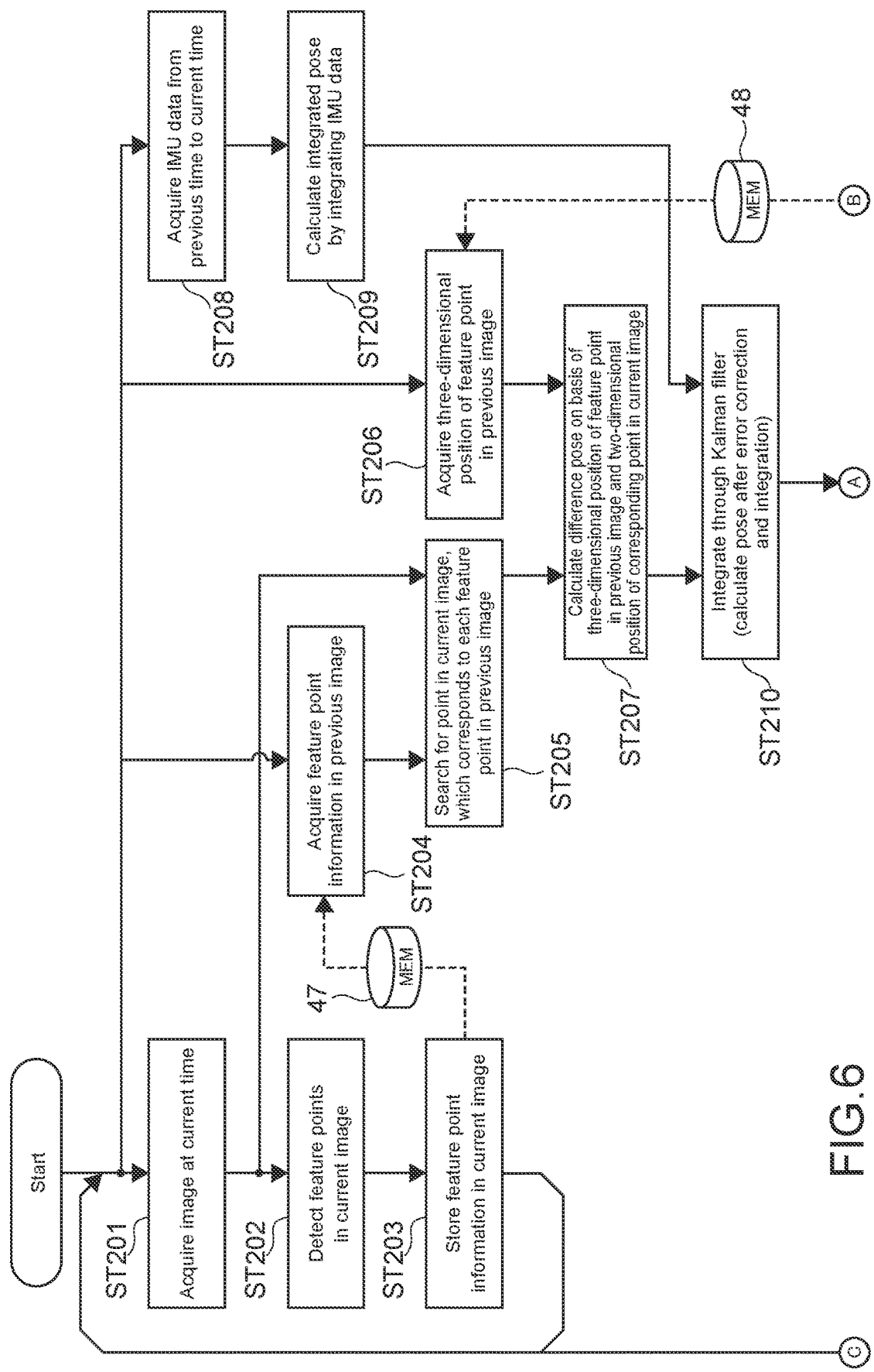
FIG. 6 A flowchart showing a calculation example of distance information in a case where an IMU is used.
Figure 7:
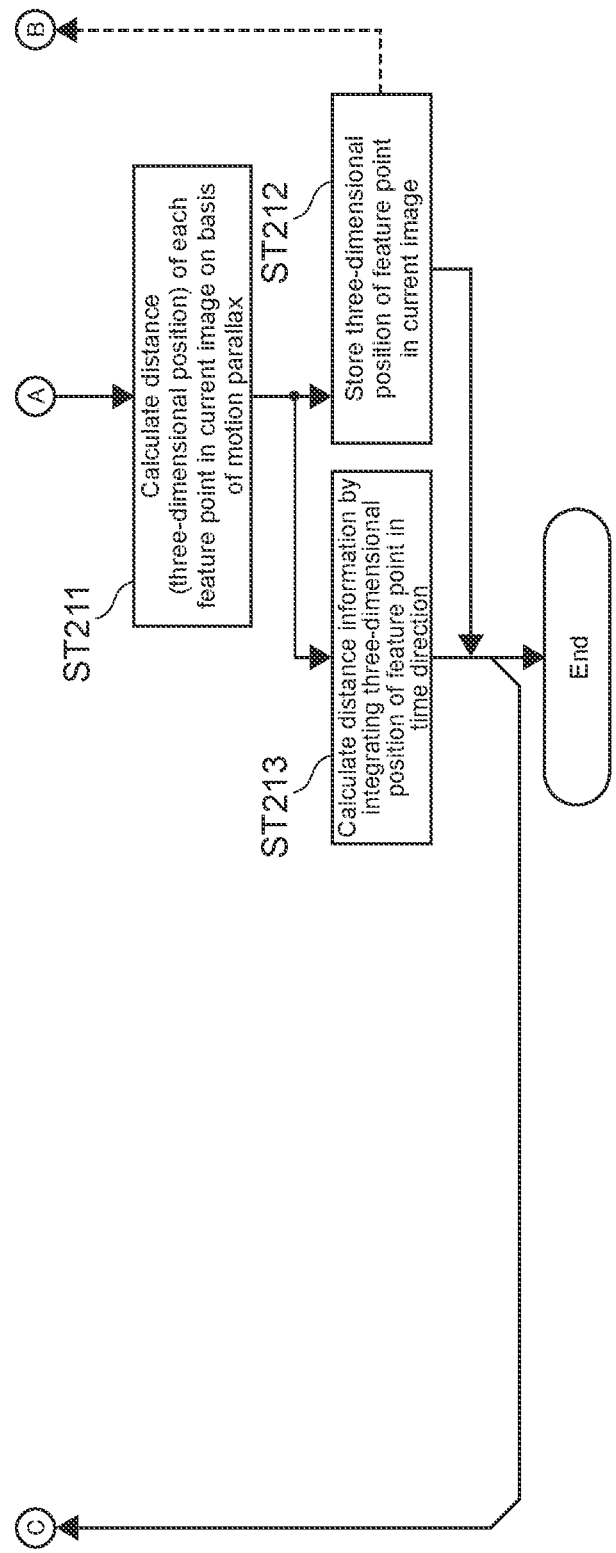
FIG. 7 A flowchart showing a calculation example of the distance information in a case where the IMU is used.

FIGS. 6 and 7 are flowcharts showing a calculation example of the distance information. Hereinafter, the operation of the estimation block 40 will be described. The operation of the estimation block 41 is performed in a manner similar to that of the estimation block 40.

The feature point detection unit 46 performs the loop of Steps 201 to 203. Specifically, an image at a current time (hereinafter, referred to as current frame image) is acquired and characteristic points (hereinafter, referred to as feature points) that can be used for self-position estimation are detected. Typically, patterns and the like having a high contrast and not having a structure similar to the surrounding structures are detected as the feature points. Examples of a method of detecting feature points and expressing feature amounts can include methods of corner detection by Harris or the like and scale invariant feature transform (SIFT). As a matter of course, the present technology is not limited thereto, and any method may be employed and machine learning or the like may be performed.

Information regarding the feature points detected in the current frame image are stored in the memory unit 47. This feature point information is, in terms of time, handled as information regarding feature points in a previous frame image when the next frame image has been acquired.

Steps 204 and 205 are performed by the motion matching unit 49. Specifically, the information regarding the "feature points in the previous image (corresponding to the previous frame image)" is acquired from the memory unit 47. Then, a feature point in the current frame image, which corresponds to each feature point in the previous frame image, is searched. Hereinafter, the corresponding feature point detected in Step 205 will be referred to as a corresponding point.

Finding the corresponding point can be considered as viewing the same object from two different viewpoints (current frame image and previous frame image), and the difference in appearance is caused by changes in the position and the attitude of the camera over time.

It should be noted that the previous frame image and the current frame image do not need to be temporally consecutive frame images, and there may be another frame image between them. Specifically, the output rate of the estimation block 40 (estimated rate of difference pose) may be lower than the imaging frame rate.

Pre-processing such as various types of correction for optical distortion and the like, gain adjustment, and the like may be performed before the current frame image is input into the feature point detection unit 46 and the motion matching unit 49. Accordingly, it is possible to improve the detection accuracy and the matching accuracy of the feature points.

Steps 206 and 207 are performed by the Δ pose estimation unit 51. Specifically, information regarding the "three-dimensional position of the feature point in the previous frame image" is acquired from the memory unit 48. Then, the difference pose is estimated by the combination of the information regarding the "three-dimensional position of the feature point in the previous frame image" and the information regarding the "two-dimensional position of the corresponding point in the current frame image".

It should be noted that the three-dimensional position of the feature point is a position (xyz coordinates) in the XYZ coordinate system set by using the front-facing camera 24 as the reference. The two-dimensional position of the feature point is a position (e.g., uv coordinates) of the feature point in the frame image. The difference pose is information including changes in the position and the attitude of the front-facing camera 24 from the imaging time of the previous frame image (hereinafter, referred to as previous time) to the imaging time of the current frame image (hereinafter, referred to as current time).

When a point group (three-dimensional position) in a three-dimensional space and a point group (two-dimensional position) on a two-dimensional plane, which corresponds to the point group (i.e., a point group in the three-dimensional space projected onto the two-dimensional plane) is given, a method of determining the position and the attitude of the projection plane (i.e., the position and the attitude of the front-facing camera 24) can be achieved by solving a minimization problem using, as cost, an error on the image when each feature point is projected onto the two-dimensional plane, for example.

Steps 208 and 209 are performed by the integration unit 42. Specifically, IMU data (data including acceleration and angular velocity) from the previous time to the current time is acquired from the IMU 33. The acquired IMU data is integrated to calculate an integrated pose.

Step 210 is performed by the Kalman filter 43. Specifically, the difference pose calculated by the Δ pose estimation unit 51 of the estimation block 40, the difference pose calculated by the Δ pose estimation unit of the estimation block 41, and the integrated pose calculated by the integration unit 42 are integrated.

The Kalman filter 43 receives two difference poses and an integrated pose. Moreover, with each pose, a probability distribution of the estimation error that the pose can include is input. The Kalman filter 43 is a filter that integrates a plurality of observations with modeled error probability distributions and estimates a current state having a highest likelihood. Specifically, the Kalman filter 43 estimates the pose having the highest likelihood from the input three poses as the current state.

The acceleration and angular velocity acquired by the IMU 33 often include offset errors called bias (constantly outputting a value with a certain value added, not returning zero even in a state of rest). In a case where those errors are included, a position and an attitude obtained by merely integrating the acceleration and angular velocity acquired through the IMU 33 contain errors.

In the Kalman filter 43, the bias of the IMU 33 can be estimated from the difference between the difference pose obtained from the front-facing camera 24 and the rear-facing camera 25 not influenced by the bias and the integrated pose obtained from the IMU 33 influenced by the bias, and an integrated pose from which the error due to the bias is eliminated by overcoming the bias can be obtained.

Moreover, since the difference poses of the two cameras are integrated, even if one of the difference poses deviates, it is corrected to have a higher likelihood (less error) by using the other difference pose and the pose of the IMU 33. Accordingly, it is possible to perform highly accurate pose estimation.

Moreover, by setting, in the Kalman filter 43, offsets of the positions and attitudes between of the devices (positions and attitudes of other devices as viewed from a certain device) as state variables in addition to the bias of the IMU 33, those can also be simultaneously estimated. For example, the offsets of the positions and attitudes between the front-facing camera 24, the rear-facing camera 25, and the IMU 33 can be simultaneously estimated.

For example, in a case where ready-made goods such as a smartphone are used, it is also possible to store the arrangement of devices such as the front-facing camera 24 and the rear-facing camera 25 as mechanical design values, read them from a device ID such as a model number, and use them as initial values of the Kalman filter 43. By doing so, errors until the estimates at the filter converge can be reduced. As a result, it is possible to improve the accuracy of the pose estimation.

Steps 211 and 212 are performed by the distance estimation unit 50. Specifically, the information regarding the "distance (three-dimensional position) of each feature point in the current frame image" is calculated by using a motion parallax. Here, on the basis of the information regarding the "two-dimensional position of the feature point in the previous frame image", the information regarding the "two-dimensional position of the corresponding point in the current frame image", and the difference pose (integrated pose from the Kalman filter 43) between the two frame images (previous to current), the distance of each feature point is estimated by using a motion parallax. Since the integrated pose calculated by the Kalman filter 43 is used, the distance based on the actual distance (three-dimensional position) is calculated.

It is assumed that a two-dimensional position of a corresponding point (feature point) in two frame images and a difference pose between the frame images are given. At this time, it is possible to determine a three-dimensional position, i.e., a distance by setting simultaneous equations that projects a point in each frame image onto a three-dimensional space (projected point is the same point) as shown below.

When the three-dimensional position of the point in the current frame image is represented by 3dCurr (x, y, z), the three-dimensional position as the point is viewed in the previous frame image is expressed by 3dPrev (x, y, z), and the pose difference between the two frame images is expressed by cPb (translation vector) and cRb (rotation matrix), the following expression is established between the two three-dimensional positions.

$$3dCurr = cRb * 3dPrev + cPb \qquad \text{[Formula 1]}$$

Moreover, the following expression is established between the three-dimensional positions 3dCurr (x, y, z) and 3dPrev (x, y, z) of each point in each frame image and the two-dimensional positions 2dCurr (u, v) and 2dPrev (u, v) projecting the point onto the image (two-dimensional plane), assuming that the internal parameter matrix of the camera is denoted by K.

$$\begin{cases} 3dCurr = 3dCurr.z * K^{-1} * 2dCurr \\ 3dPrev = 3dPrev.z * K^{-1} * 2dPrev \end{cases} \qquad \text{[Formula 2]}$$

Here, the inner matrix K of the camera is expressed by the following expression, using a focal length f (x, y) and an optical center c (x, y).

$$K = \begin{bmatrix} f_x & 0 & c_x \\ 0 & f_y & c_y \\ 0 & 0 & 1 \end{bmatrix} \qquad \text{[Formula 3]}$$

The expressions (Formula 1) and (Formula 2) provide the following simultaneous equations.

$$3dCurr.z * \begin{pmatrix} (2dCurr.u - c_x)/f_x \\ (2dCurr.v - c_y)/f_y \\ 1 \end{pmatrix} = \qquad \text{[Formula 4]}$$

$$3dPrev.z * cRb * \begin{pmatrix} (2dPrev.u - c_x)/f_x \\ (2dPrev.v - c_y)/f_y \\ 1 \end{pmatrix} + cPb$$

The simultaneous equations of the expression (Formula 4) are three equations for two variables (3dCurr.z and 3dPrev.z). Therefore, by solving the simultaneous equations for 3dCurr.z, the distance of each point in the current frame image is determined. When the distance 3dCurr.z is determined, the three-dimensional position of the point can be determined by the expression (Formula 2).

The three-dimensional position of the feature point calculated in Step 211 is stored in the memory unit 48 as point cloud information and is used at the time of pose estimation in the future. For example, in Step 206, the three-dimensional position of the feature point in the previous frame image acquired by the A pose estimation unit 51 is information stored in Step 212 at the timing at which the previous frame image is the "current frame image".

Step 213 is performed by the three-dimensional reconstruction unit 44. Specifically, the distance information is calculated by integrating the three-dimensional position of the feature point calculated in Step 211 in a time direction. More particularly, the information regarding the "integrated pose at each time" output from the Kalman filter 43, the information regarding the "distance to the first wall surface 11 as viewed from the front-facing camera 24 (three-dimensional coordinates of each feature point)" output from the estimation block 40, and the information regarding the "distance to the second wall surface 12 as viewed from the rear-facing camera 25 (three-dimensional coordinates of each feature point)" output from the estimation block 41 are integrated in the time direction.

In a case where two cameras $c_0$ and $c_1$ are mounted, the position and the attitude of $c_0$ at a certain time t are $Pc_0[t]$ (translation vector) and $Rc_0[t]$ (rotation matrix), and offsets of a position and an attitude of a camera $c_1$ as viewed from a camera $c_0$ are $c_0Pc_1$ and $c_0Rc_1$. At this time, the positions $Pc_1[t]$ and $Rc_1[t]$ of the camera $c_1$ can be determined by the following expression.

$$Pc_1[t]=Rc_0[t]*c_0Pc_1+Pc_0[t]$$

$$Rc_1[t]=Rc_0[t]*c_0Rc_1 \quad \text{[Formula 5]}$$

The three-dimensional position of the feature point on the target object (wall surface) that can be seen from the camera $c_0$ is expressed by $c_0Px_0$ and the three-dimensional position of the target object that can be seen from the camera $c_1$ is similarly expressed by $c_1Px_1$. Here, x in the subscript represents each feature point and is equal in number to the feature points, though for the sake of simplicity, those are collectively denoted by $x_0/x_1$. At this time, the expression for converting the three-dimensional position of each of those feature points into a coordinate value $Px_0/Px_1$ in a fixed coordinate system (fixed coordinate system independent of the changes in position and attitude of the camera) is as follows.

$$\begin{cases} Px_0 = Rc_0[t]*c_0Px_0 + Pc_0[t] \\ Px_1 = Rc_1[t]*c_1Px_1 + Pc_1[t] \end{cases} \quad \text{[Formula 6]}$$

As described above, the three-dimensional position of the target object viewed from each camera is projected onto a certain coordinate system by using the integrated pose at each time. Accordingly, the integration in the time direction becomes possible, and a surface can be constituted by a plurality of feature points drawn on the target object (wall surface). When a normal is determined from this surface and its normal vector (unit vector) is represented by $N_0$, a distance $d_0$ between the camera $c_0$ and its surface can be determined in accordance with the following expression. The operator "·" in the expression represents the inner product of the vector.

$$d_0=|c_0Px_0 \cdot N_0| \quad \text{[Formula 7]}$$

It should be noted that in the expression, $c_0Px_0$ is a three-dimensional position of a feature point $x_0$ constituting the "surface whose normal vector is $N_0$" as viewed from the camera $c_0$ and is a translation vector from the camera $c_0$ to that point. On the other hand, regarding the other surface that can be seen from the camera $c_1$, a distance $d_1$ between the camera $c_1$ and its surface can be determined in accordance with the following expression when the normal vector of that surface is represented by $N_1$.

$$d_1=|c_0Px_1 \cdot N_1| \quad \text{[Formula 8]}$$

In the expression, $c_0Px_1$ is a three-dimensional position of a feature point $x_1$ constituting the surface whose normal vector is $N_1$ as viewed from the camera $c_0$, and can be determined in accordance with the following expression. $R^T$ represents the transpose of a rotation matrix R.

$$c_0Px_1=Rc_0^T*(Px_1-Pc_0) \quad \text{[Formula 9]}$$

Thus, a width t of the passageway 10 sandwiched between the "surface whose normal vector is $N_0$" and the "surface whose normal vector is $N_1$" can be determined as a sum of the distance $d_0$ and the distance $d_1$. For example, the value of the width t of the passageway is output in real time in accordance with the application as the distance information. Alternatively, a width of a narrowest portion on the path so far can be output, for example, and used as the distance information.

The calculation method for the distance information in Step 213 is not limited, and any algorithm or the like may be used. Moreover, machine learning or the like may be performed.

In the examples shown in FIGS. 4 to 7, the respective blocks shown in FIG. 5 cooperate to realize the "acquisition unit" that acquires the scale information and the "output control unit". Moreover, the difference pose, the integrated pose, and the integrated pose output by the estimation block 40 are included in the first position information. Moreover, the difference pose, the integrated pose, and the integrated pose output by the estimation block 41 are included in the second position information. That is, the integrated pose and the integrated pose are included in both the first position information and the second position information.

Therefore, in this example, the first position information is calculated on the basis of the first image captured by the front-facing camera 24. Moreover, the first position information is calculated on the basis of the first image captured by the rear-facing camera 25. Moreover, the first position information and the second position information are calculated on the basis of the detection result of the IMU 33.

Moreover, it is assumed that the arrangement of devices such as the front-facing camera 24 and the rear-facing camera 25 is stored as mechanical design values and those are read out from the device ID and used as described above. In this case, the information to be read corresponds to the information regarding the positional relationship between the front-facing camera 24 and the rear-facing camera 25. Moreover, the information to be read corresponds to information regarding a device mounted on the portable terminal 20.

Moreover, a device information acquisition unit is realized by a block that stores mechanical design values and a block that reads the mechanical design values (not shown). Moreover, processing using the read information as an initial value of the Kalman filter 43 or the like corresponds to processing of outputting the distance information on the basis of the information regarding the positional relationship between the front-facing camera 24 and the rear-facing camera 25 and processing of outputting the distance information on the basis of the information regarding the device.

As a matter of course, those are examples of the device information acquisition unit, the information regarding the device, and the distance information based on the information regarding the device, and any other information and algorithm may be employed.

<Methods Using Known Target Object>

For example, in a case of estimating a self-position (or distance) by using a single camera or the like, the scale ambiguity problem may occur if there is no method of acquiring scale information (physical scale) regarding the actual distance in the real world. In the above-mentioned example, the IMU data acquired by the IMU 33 has a physical scale in the real world, and the ambiguity is solved by using it.

Next, the method using the known target object whose size is known will be described. The known target object can also be referred to as a known target, a marker, or the like. The known target object whose size is known corresponds to a known target object with which the information regarding the actual distance is associated. For example, a known target object or the like whose actual distance between feature points included in the known target object is known may be used.

Detection of the known object is realized by image matching using machine learning, for example. Moreover, in a case where a history of purchases at an e-commerce site exists in a server, it is also possible to specify the known target by performing object recognition on the basis of the data of the purchase history.

Examples of the known object can include products purchased at e-commerce sites, such as furniture, and standardized industrial products (plastic bottle, tatami, outlet, fire extinguisher, and the like).

Figure 8:
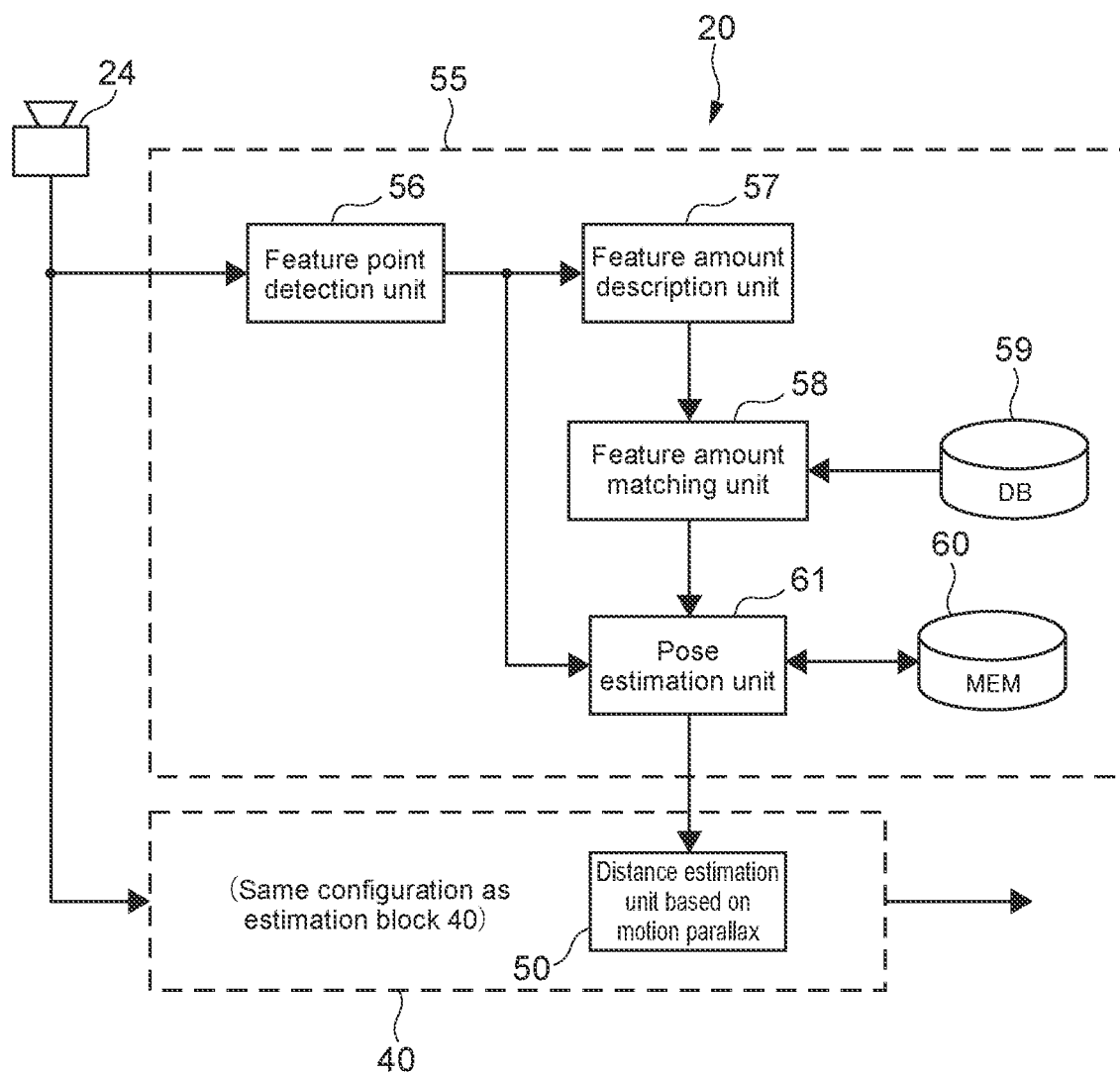
FIG. 8 A schematic block diagram showing an example of the software configuration of the portable terminal.

FIG. 8 is a schematic block diagram showing an example of the software configuration of the portable terminal 20. In the example shown in FIG. 5, the integrated pose output from the Kalman filter 43 is input into the distance estimation unit 50 of the estimation block 40. In this example, a pose estimation block 55 is constructed as shown in FIG. 8. The pose estimated by the pose estimation block 55 is input into the distance estimation unit 50.

The pose estimation block 55 includes a feature point detection unit 56, a feature amount description unit 57, a feature amount matching unit 58, memory units 59 and 60, and a pose estimation unit 61. The memory units 59 and 60 may be configured in the controller 21 or may be configured in the storage unit 32.

Figure 9:
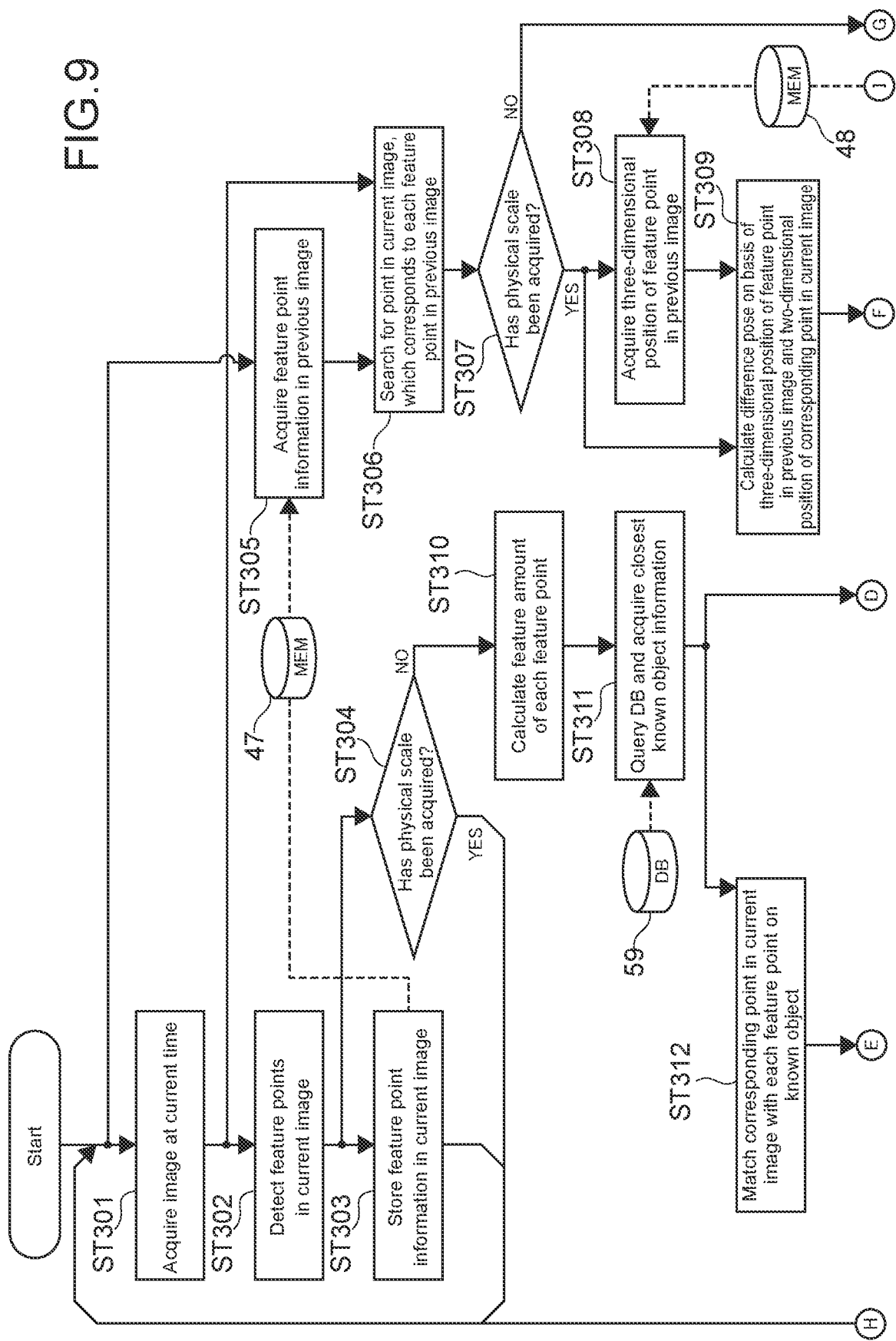
FIG. 9 A flowchart showing a calculation example of distance information in a case where a known target object is wished to be used.
Figure 10:
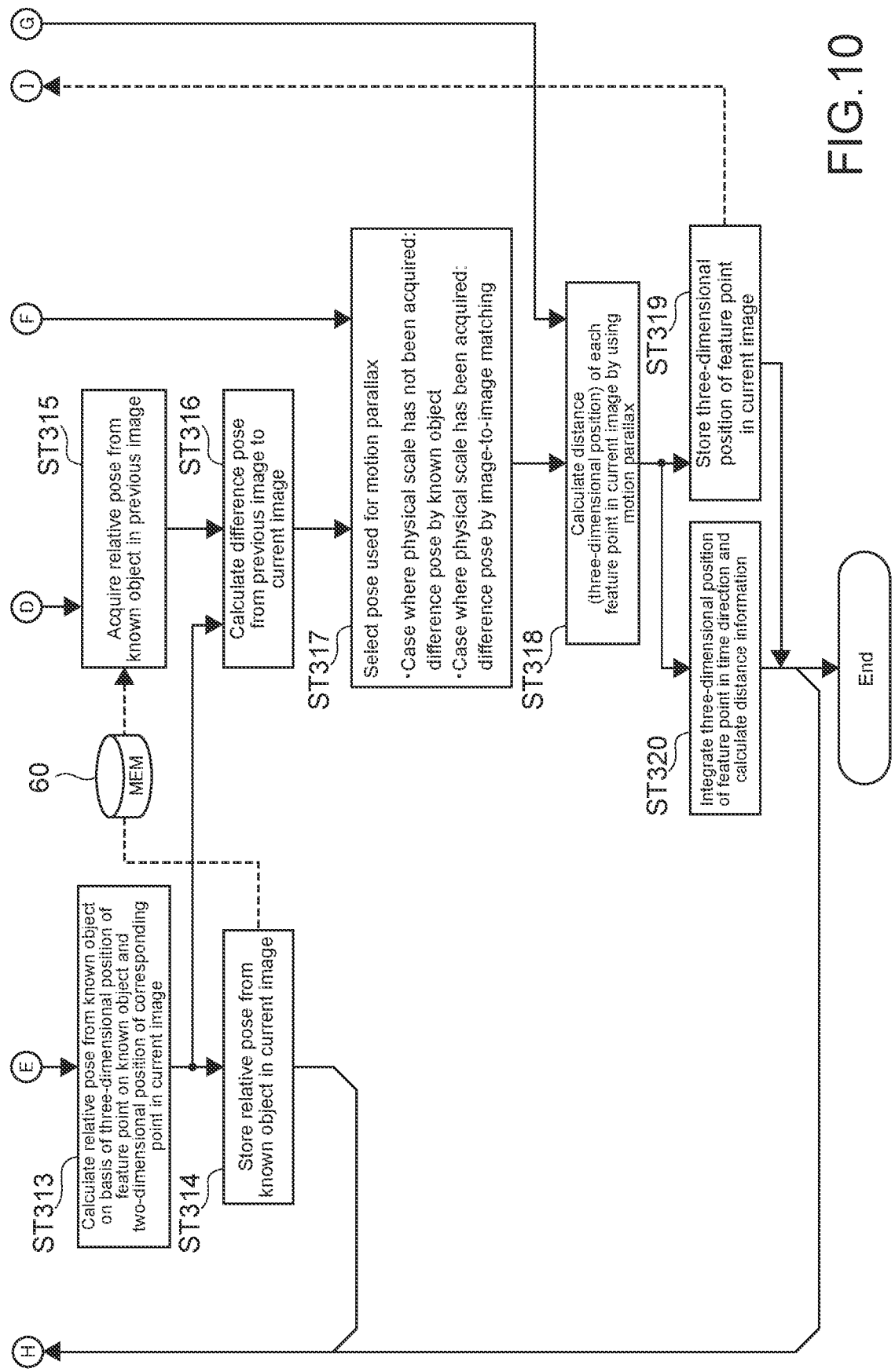
FIG. 10 A flowchart showing a calculation example of the distance information in a case where the known target object is wished to be used.

FIGS. 9 and 10 are flowcharts showing a calculation example of the distance information. In FIGS. 9 and 10, the known target object is referred to as a known object. Attention is first directed to Steps 304, 307, and 317. In a state in which the physical scale has been acquired, YES is determined in Steps 304 and 307. In this case, a difference pose obtained by image-to-image matching is used as shown in Step 317.

Calculation of the difference pose by the image-to-image matching is performed by Steps 301 to 303, 305, 306, 308, and 309. This processing is processing similar to Steps 201 to 207 shown in FIGS. 6 and 7. Specifically, the Δ pose estimation unit 51 of the estimation block 40 estimates the difference pose by using the combination of the information regarding the "three-dimensional position of the feature point in the previous frame image" and the information regarding the "two-dimensional position of the corresponding point in the current frame image".

The Kalman filter 43 integrates the difference pose calculated by the Δ pose estimation unit 51 of the estimation block 40 and the difference pose calculated by the Δ pose estimation unit 51 of the other estimation block 41. It should be noted that the difference pose estimated by the other Δ pose estimation unit 51 may be used without performing the integration by the Kalman filter 43.

Processing in a state in which the physical scale is not acquired will be described. Specifically, a case where the determination of NO is made in Steps 304 and 307 will be described.

Step 310 is performed by the feature point detection unit 56 and the feature amount description unit 57. Specifically, the feature point detection unit 56 detects the feature point from the captured frame image. Then, for each of the detected feature points, the feature amount description unit 57 describes the feature amount for matching.

Here, it is important how to express the feature point for matching also with a change in viewing such as rotation, enlargement/reduction, and luminance change. Various description methods have been devised for it, and SIFT, oriented FAST and rotated BRIEF (ORB), or the like can be used.

Information regarding the feature amount, the three-dimensional position, and the like of each feature point constituting the known object is stored in the memory unit 59 in the form of a database. The specific object employed as the known object is not limited, and any object may be employed. As a matter of course, a mark or the like shown on the object may be employed.

Step 312 is performed by the feature amount matching unit 58. Specifically, the corresponding point in the current frame image is matched with each feature point on the known object. Specifically, the feature amount of each feature point output from the feature amount description unit 57 and the feature amount acquired from the known object DB in the memory unit 59 are matched with each other, and the corresponding point on the known object corresponding to each feature point in the current frame image is determined.

Steps 313 to 316 are performed by the pose estimation unit 61. The three-dimensional position can be acquired from the known object DB as the corresponding point on the known object. Therefore, the position and the attitude of the two-dimensional plane (i.e., the position and the attitude of the camera) can be determined from a point group in the three-dimensional space and a point group on the two-dimensional plane, which corresponds to the point group. It should be noted that the position and the attitude of the camera relative to the known object is determined here. Hereinafter, the "position and the attitude of the camera relative to the known object" will be referred to as a relative pose.

The relative pose calculated from the known object in the current frame image is stored in the memory unit 60. When calculating the difference pose, the relative pose calculated from the known object in the previous frame image stored in the memory unit 60 is acquired. Then, a difference from the relative pose similarly determined at a future time is calculated. Accordingly, it is possible to calculate the difference pose between the two frame images (previous to current).

As shown in Step 317, the output difference pose is selected as a pose to be used for a motion parallax and is input into the distance estimation unit 50 of the estimation block 40. The difference pose has a physical scale derived from the known object, and the physical scale is taken in the output of the estimation block 40 by using it as the movement amount in the distance estimation unit 50.

The processing of Steps 318 to 320 is processing similar to that of Steps 211 to 213 shown in FIGS. 6 and 7.

Thus, in this example, scale information is acquired on the basis of an image obtained by imaging, by each of the front-facing camera 24 and the rear-facing camera 25, a known target object with which information regarding the actual distance (physical scale) is associated.

Typically, two pose estimation blocks 55 are configured for the estimation block 40 associated with the front-facing camera 24 and the estimation block 41 associated with the rear-facing camera 25, respectively. Then, scale information is acquired on the basis of a captured image of the known target object captured by each of the front-facing camera 24 and the rear-facing camera 25.

The present technology is not limited thereto, and the pose estimation block 55 may be configured only for one of the estimation blocks and its estimation result may be input into the distance estimation unit 50 of the other estimation block. That is, the scale information may be acquired on the basis of the captured image of the known target object captured by either the front-facing camera 24 or the rear-facing camera 25.

Moreover, in a case where it is determined that the physical scale has not been acquired, the user may be notified of notification information for instructing to image the known object.

In the examples shown in FIGS. 8 to 10, the pose estimation block 55 functions as a part of the "acquisition unit" that acquires the scale information and the "output control unit". That is, the pose estimation block 55 may acquire the scale information on the basis of the image obtained by imaging the known target object with which the information regarding the actual distance is associated by at least one of the front-facing camera 24 or the rear-facing camera 25. Moreover, the difference pose output by the pose estimation block 55 is included in both the first position information and the second position information.

<Method Using Distance Measurement Sensor>

Next, the method using the distance measurement sensor such as the ToF sensor will be described. In this example, a distance measurement sensor 65 such as the ToF (see FIG. 11) is configured in the sensor unit 26 illustrated in FIG. 2. The specific configuration of the distance measurement sensor 65 is not limited, and any configuration may be employed.

Figure 11:
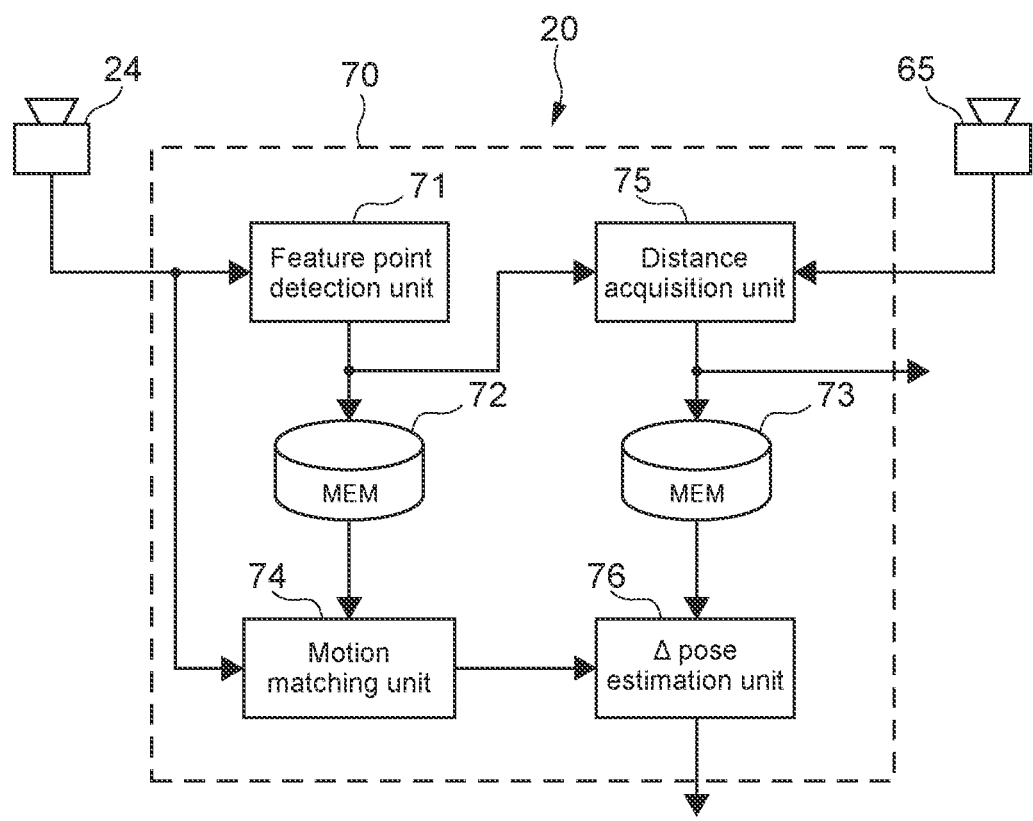
FIG. 11 A schematic block diagram showing an example of the software configuration of the portable terminal.

FIG. 11 is a schematic block diagram showing an example of the software configuration of the portable terminal 20. In this example, an estimation block 70 is configured associated with the front-facing camera 24. The estimation block 70 includes a feature point detection unit 71, memory units 72 and 73, a motion matching unit 73, a distance acquisition unit 75, and a Δ pose estimation unit 76.

In this example, it is possible to calculate a distance directly by the distance measurement sensor 65. Therefore, the estimation block 70 can be compared with the estimation block 40 illustrated in FIG. 5, and has a configuration in which the distance estimation unit 50 has been replaced by the distance acquisition unit 75. It should be noted that an estimation block having the same configuration as the estimation block 70 is constructed, associated with the rear-facing camera 25.

It should be noted that the distance measurement sensor 65 is arranged to be in a predetermined positional relationship with the front-facing camera 24 and the rear-facing camera 25. For example, the positions and attitudes of the front-facing camera 24, the rear-facing camera 25, and the distance measurement sensor 65 also change in conjunction with changes in the position and the attitude of the portable terminal 20 itself.

Figure 12:
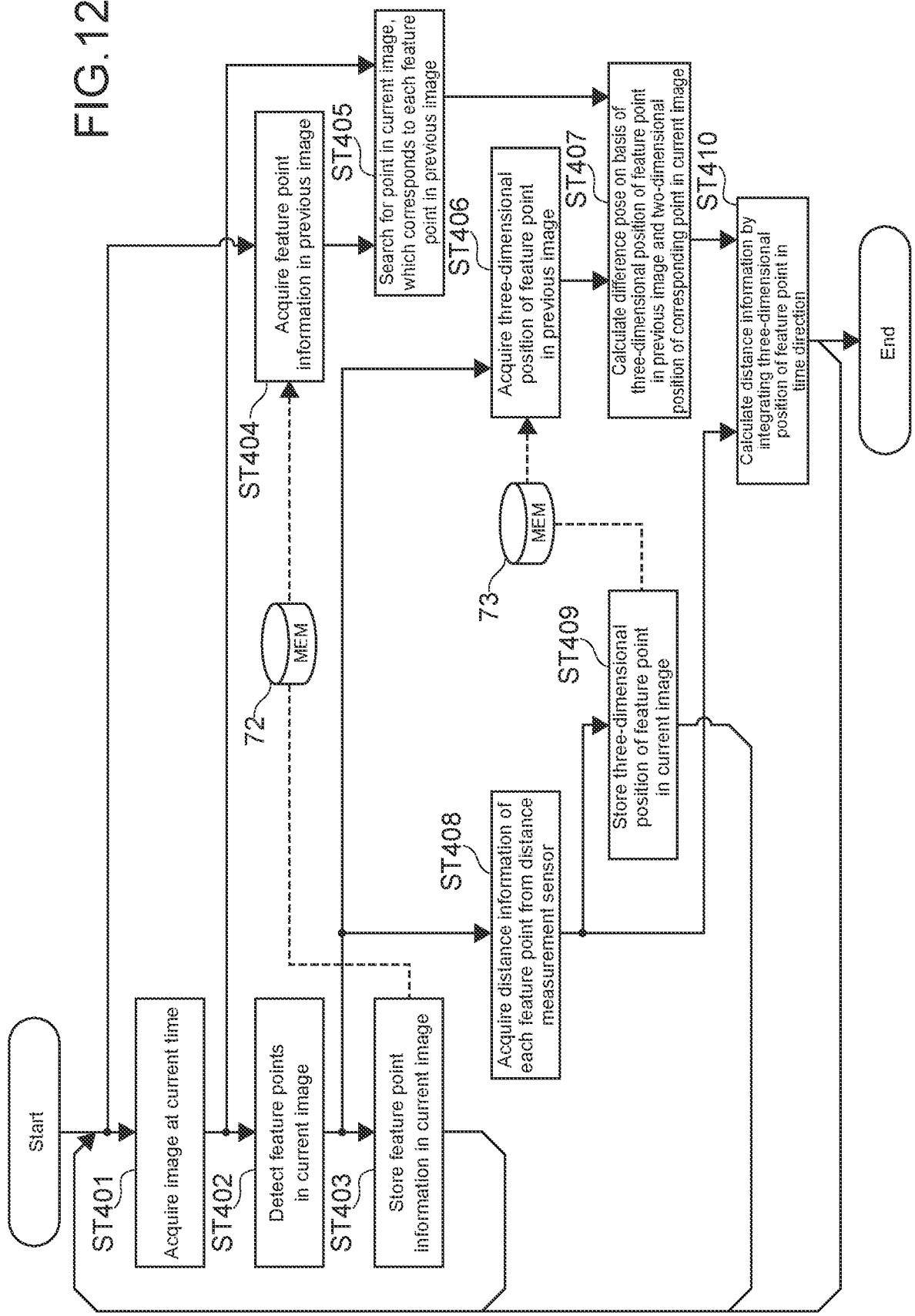
FIG. 12 A flowchart showing a calculation example of distance information in a case where a distance measurement sensor is used.

FIG. 12 is a flowchart showing a calculation example of the distance information. For example, it is assumed that the ToF sensor is used as the distance measurement sensor 65. The ToF sensor is a device capable of obtaining a physical distance to the target object by measuring a time required for light emitted by a light emitting portion to be reflected on the target object and return to a light receiving portion.

If the front-facing camera 24 and the ToF sensor are calibrated, it is possible to associate a pixel in a frame image captured by the front-facing camera 24 with a pixel on the ToF light receiving portion. Accordingly, it is possible to obtain, through the ToF sensor, the distance of each feature point extracted from the frame image.

The distance acquisition unit 75 performs the association of the pixels and acquires the distance of each feature point from the ToF sensor. As a matter of course, also in a case where the distance measurement sensor other than the ToF sensor is used, it is possible to directly obtain the distance of each feature point.

In the flowchart of FIG. 12, Steps 408 and 409 are processing performed by the distance acquisition unit 75. Since it is possible to obtain a distance on the basis of the physical scale obtained from the distance measurement sensor 65, the physical scale is taken in the output of the estimation block 70 (three-dimensional position of each feature point and the difference pose).

In Step 410, on the basis of the output of the estimation block 70, the three-dimensional position of the feature point is integrated in the time direction and the distance information is calculated. The other steps are similar to the processing described with reference to FIG. 5.

It should be noted that in the example shown in FIG. 11, the front-facing camera 24 is used as an imaging device according to the present technology and the distance measurement sensor 65 is used separately from the front-facing camera 24. For example, the configuration of the ToF sensor may be employed as the imaging device. For example, the ToF light receiving portion may be configured to be the same as the camera. In this case, the first imaging device itself also functions as the distance measurement sensor.

For example, in a case where the ToF sensor is used as the imaging device, it is possible to function the ToF sensor also as the distance measurement sensor, and thus it is possible to perform the processing described with reference to FIGS. 11 and 12.

In the examples shown in FIGS. 11 and 12, the distance acquisition unit 75 functions as a part of the "acquisition unit" that acquires the scale information and the "output control unit". Moreover, the difference pose output by the estimation block 70 is included in the first position information. Moreover, the difference pose output by the other estimation block is included in the second position information.

Therefore, in this example, the scale information is acquired on the basis of the detection result of the distance measurement sensor 65. Moreover, the first position information and the second position information are calculated on the basis of the detection result of the distance measurement sensor 65.

<Combination of Three Methods Based on Mounted Device>

The "method using the motion sensor", the "method using the known target object", and the "method using the distance measurement sensor" may be combined as appropriate and performed.

A general operating system software (OS) employed in a smartphone or the like has information on what type of device is connected and various APIs for using it in order to use the connected device. By inquiring of the OS, it is possible to determine what types of device is available, and it is possible to change (select) the configuration for implementing the present technology on the basis of them.

For example, a combination in which the front side of the portable terminal measures the distance by using the ToF mounted thereon and the back side uses a marker for acquiring the physical scale because there is no ToF or IMU is also possible. Furthermore, any method may be employed as a method of determining the combination. The user may be able to designate a method of acquiring the scale information regarding the actual distance.

For example, the ToF is considered to be very advantageous in terms of distance accuracy and robustness to a textureless environment. Therefore, in a case where the ToF is available, control such as preferential selection of the ToF may be performed.

It should be noted that the block that inquires of the OS to acquire the information regarding the device corresponds to the device information acquisition unit. Moreover, the process of selecting the scale information on the basis of the information related to the device corresponds to the processing of outputting the distance information on the basis of the information regarding the device.

<Notification of Situation Where Estimation of Self-Position is Disadvantageous>

In order to estimate the self-position of the camera, it is first necessary to estimate the distance to the target object to be imaged. However, the estimation accuracy of this distance depends on a baseline length (an amount of movement translating in a direction perpendicular to a line-of-sight direction in a case of a monocular camera), and translating in a direction perpendicular to the direction of the camera's line-of-sight direction (in a case where the camera is directed to the wall, translating along the wall surface) is a most accurate movement.

Therefore, in order to model the width of the passageway 10 most efficiently, as shown in FIGS. 2 and 3, the front-facing camera 24 of the main surface 20a and the rear-facing camera 25 of the back surface 20b are held to face the first wall surface 11 and the second wall surface 12 sandwiching the passageway 10 respectively and translate along the first wall surface 11 and the second wall surface 12 as they are.

Although modeling is performed by walking the passageway 10 while holding the portable terminal 20 as described above, there may be cases where self-position (or distance) estimation cannot be performed successfully on the passageway 10, for example, a case where it is dark, a case where it is difficult to acquire sufficient feature points on the first wall surface 11 and the second wall surface 12, or a case where there is no overlap between frames due to a too fast motion.

For example, even if one camera of the front-facing camera 24 and the rear-facing camera 25 temporarily enters such a situation, it may be possible to suppress a decrease in estimation accuracy by allowing the other camera viewing the opposite side to capture a valid image. However, if such a situation continues for a long time, there is a higher possibility that the self-position (or distance) estimation may fail.

Therefore, it is determined whether or not the situation is disadvantageous to the self-position estimation, and in a case where the situation is disadvantageous, it is notified to the user 1. In a case where the situation is disadvantageous, the information for overcoming the disadvantageous situation is notified. Accordingly, it is possible to generate the distance information efficiently and with high accuracy.

For example, in a case where the number of points that can be detected by the feature point detection unit 46 or that can be matched by the motion matching unit 49 is reduced, it is determined that the situation is disadvantageous to estimation in the estimation block 40 or the like illustrated in FIG. 5.

Moreover, in a case where the difference between the integrated pose of the IMU 33 and the difference pose by the camera (Mahalanobis distance or the like considering the error probability distribution) becomes large when integrating the pose in the Kalman filter 43, it is determined that the situation is disadvantageous to the estimation.

For example, in such a disadvantageous situation (dark, plain, fast motion, etc.) as described above or the like, even if the matching fails or the pose can be estimated, the error is large (the deviation from the integrated pose of the IMU 33 is large), and thus it can be determined that the situation is disadvantageous to the estimation.

In a case where it is determined that the situation is disadvantageous to the estimation of the self-position, the user is notified of the fact by sound, light, vibration, or the like. For example, display on a display, audio output, or the like may be performed. Then, the user is guided by an instruction to light up, direct the camera to a different surface, slow down the motion, or the like such that the disadvantageous situation does not continue. Accordingly, it is possible to improve the generation accuracy of the distance information.

The situation disadvantageous to the estimation of the self-position is a concept included in a situation disadvantageous to output of the distance information. For example, it is possible to determine a situation disadvantageous to execution of processing different from the estimation of the self-position and notify the user of the situation as appropriate.

Moreover, the block for determining whether or not it is the situation disadvantageous to the estimation of the self-position or the like and the block for notifying of the fact are blocks corresponding to a notification unit according to the present technology. Moreover, the instruction to light up, direct the camera to a different surface, slow down the motion, or the like corresponds to notification of information for overcoming the disadvantageous situation. As a matter of course, the present technology is not limited to those notifications and the like, and other arbitrary information may be notified as information for overcoming the disadvantageous situation.

Figure 13:
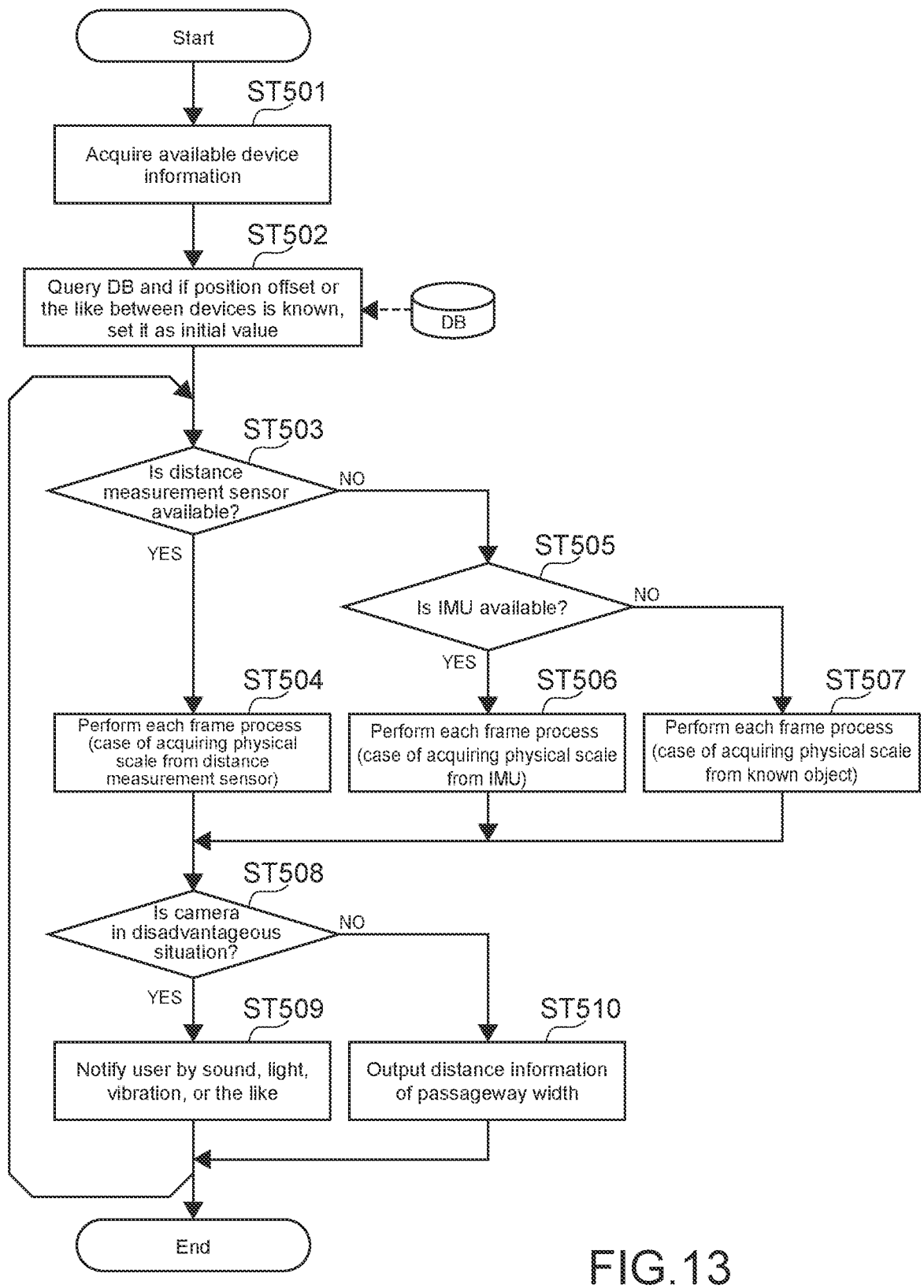
FIG. 13 A flowchart showing a processing example including switching of three methods based on a device and determination processing as to a disadvantageous situation.

FIG. 13 is a flowchart showing an example of processing including switching of three methods based on a device and processing of determining the disadvantageous situation. It can also be said that the processing illustrated in FIG. 13 is an overall processing example for generating the distance information.

By inquiring of the OS or the like, the information regarding an available device is acquired (Step 501). In a case where the device information is stored as a database, the DB is queried and, if a position offset or the like between devices is known, it is set as an initial value of the Kalman filter or the like (Step 502).

In a case where it is determined on the basis of the device information that the distance measurement sensor is available, each frame processing is performed in a method using the distance measurement sensor as described with reference to FIGS. 11 and 12 (from YES in Step 503 to Step 504).

In a case where the distance measurement sensor is unavailable and the IMU is available, each frame process is performed in the method using the IMU as described with reference to FIGS. 4 to 7 (YES in Step 505 to Step 506).

In a case where the distance measurement sensor and the IMU are unavailable, each frame process is performed in the method using the known target object as described with reference to FIGS. 8 to 10 (NO in Step 505 to Step 507).

In a case where it is determined that the camera is in the disadvantageous situation, the user is notified of the fact by sound, light, vibration, or the like (YES in Step 508 to Step 509). In a case where it is determined that the camera is not in the disadvantageous situation, the distance information including the passageway width or the like is output (Step 510 from NO in Step 508).

It should be noted that in the embodiment shown in FIG. 13, the block for performing the processing of Steps 501 and 502 corresponds to the device information acquisition unit. Moreover, the block for performing the processing of Steps 508 and 509 corresponds to the notification unit. Those blocks can be realized, for example, by executing a predetermined program by the CPU of the controller 21. Moreover, in order to realize those blocks, dedicated hardware such as an integrated circuit (IC) may be used as appropriate.

<Imaging Directions of Two Imaging Devices>

Figure 14:
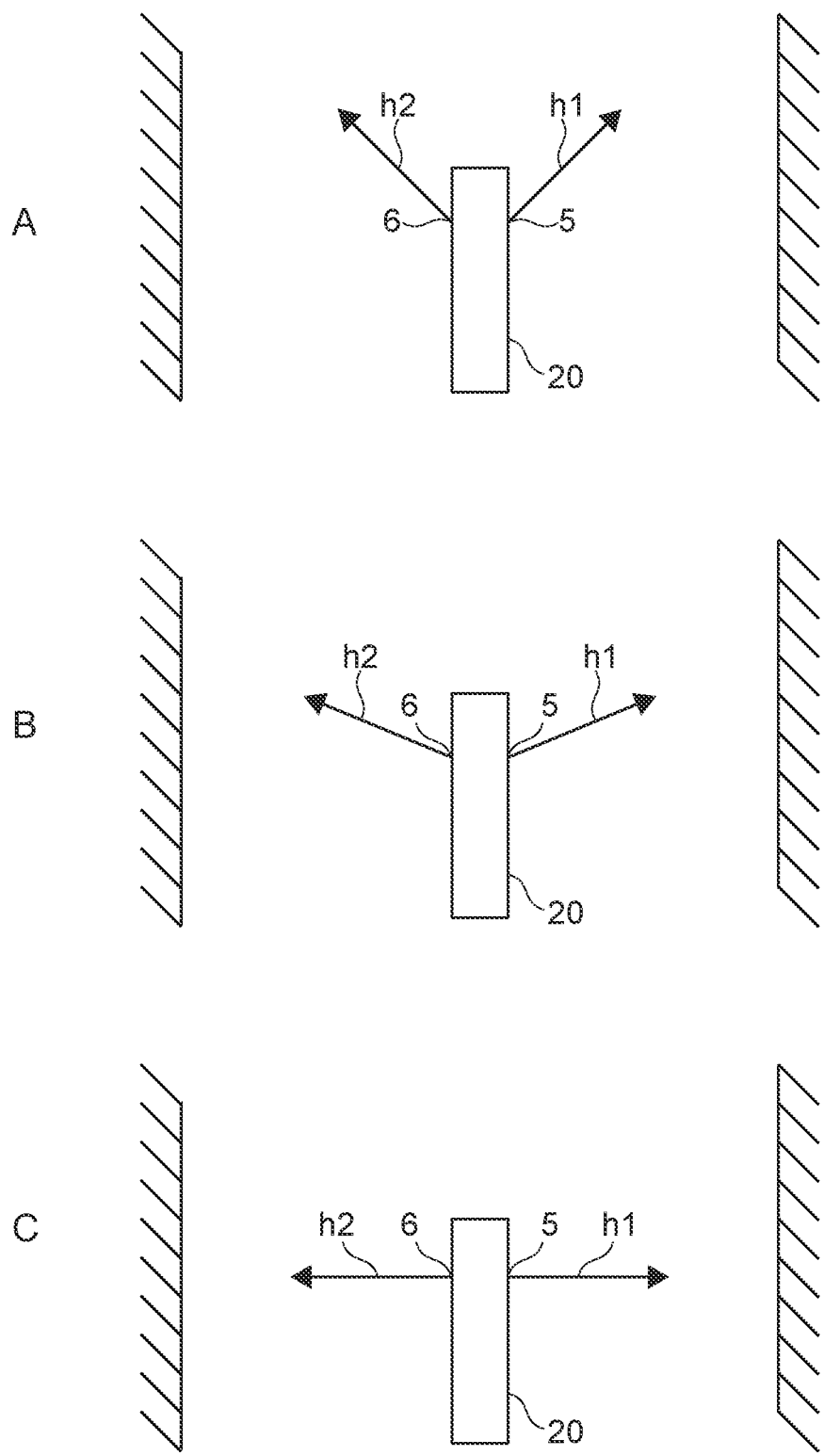
FIG. 14 A schematic diagram for describing an angle of intersection of imaging directions of a first imaging device and a second imaging device.

FIG. 14 is a schematic diagram for describing an angle of intersection of the imaging directions of the first imaging device 5 and the second imaging device 6.

For the camera configuration of the portable terminal 20 such as a smartphone, it is often employed an arrangement in which two cameras (first imaging device 5 and second imaging device 6) are arranged back-to-back, i.e., the angle formed by the two cameras is 180° as shown in FIG. 14C. This camera arrangement is widespread, highly available, and excellent in the introduction cost (existing smartphones can be used as they are).

It should be noted that the angle formed by the two cameras are an angle of intersection of a first direction h1 that is the imaging direction of the first imaging device 5 and a second direction h2 that is the imaging direction of the second imaging device 6.

Since the two cameras are arranged back-to-back, the distance to both sides of the passageway can be determined simultaneously and relatively accurately in one motion. In a case where the distance from the camera to each wall surface is known, the width of the passageway sandwiched between the wall surfaces can be determined by adding it.

On the other hand, the processing contents itself of the present technology are not limited to such a camera arrangement, and can be used in other cases. For example, an arrangement in which the angle formed by the two cameras is 90° as illustrated in FIG. 14A can be exemplified. In general, self-position estimation using a camera is less sensitive to movement in a depth direction because the change in viewing is small when the camera moves in the depth direction.

In the arrangement in which the angle formed by the two cameras is 90 degrees, the depth direction of one of the cameras is the horizontal (or vertical) direction of the other, and there is thus an advantage that they can make up for each other's weak points. In this respect, it is considered to be very advantageous that the angle between the two cameras is 90° and the degree of disadvantage is considered to be equal in either case where the angle is more acute or obtuse than that angle.

For example, an acute angle between the two cameras has a higher probability that the surfaces seen by the two cameras are the same and tends to be less tolerant to a case where the surface is textureless (an obtuse angle between the two cameras has a higher probability that another surface with a texture can be observed). Thus, as illustrated in FIGS. 14A to C, a configuration in which the angle formed by the two cameras ranges from 90° to 180° is considered to be desirable for the camera arrangement.

As described above, in the distance information generation system 100 according to this embodiment, the distance information based on the actual distance between the first target object imaged by the first imaging device and the second target object imaged by the second imaging device is generated on the basis of the scale information, and the first position information of the first imaging device 5, and the second position information of the second imaging device 6. Accordingly, it is possible to easily and accurately measure the distance between the first target object and the second target object.

For example, in a case where large furniture is purchased or the like, a problem as to whether the large furniture can be carried into the installation location arises. In general, this problem has been addressed by actually measuring, with a tape measure or the like, a passageway width of a location such as an entrance, a corner, or the like likely to be a bottleneck on the carry-in path. However, in this method, the longer the passageway length and the larger the number of measurement points, the larger the burden becomes. Moreover, there is also a risk of measurement omission and, for example, the location that has not been measured may be actually narrow.

For example, a surface that the camera faces can be modelled by a technology such as the SLAM. For example, it is necessary to model at least two sides of the passageway for measuring the passageway width by using one camera, and thus it is necessary to walk the passageway twice (with the camera facing a different side each time). Moreover, the self-position of the camera is estimated simultaneously when the environment is modeled, it has an error proportional to the amount of movement, which is called drift, and there is a problem in that the error increases as the path to be modeled becomes longer, and the modeled result is distorted.

In the present technology, the two cameras (e.g., front- and rear-facing cameras of the smartphone) oriented in different directions are used to model the wall surfaces on both sides of the passageway. Therefore, by walking the carry-in path while holding the two cameras facing the wall surfaces on both sides, it is possible to easily and accurately grasp the width of the path.

It is possible to know the width of the path that the user is currently walking in real time. In addition, it is also possible to know the narrowest part or the like of the path so far. Thus, it is possible to easily judge whether or not the product can be carried in. Moreover, the passageway width can be modeled simply by a general smartphone or the like without preparing a special tool. Moreover, it is the simple method of walking the path while holding the smartphone, and even a general consumer can easily perform it alone.

Moreover, since the modeling can be performed continuously from the start point to the end point of the path, it is possible to prevent measurement omission in a partially narrow place or the like. Moreover, since both sides of the passageway can be modeled in a single operation, the burden is halved as compared with the case of performing an operation for each side.

Since in the case of performing modeling for each side by the use of a single camera, the estimation error occurs and accumulates for each operation, it is advantageous to be able to perform it in a single operation also in terms of the accuracy. Moreover, in a case where the modeling is performed for each side, there is also a problem as to how to combine the modeling results of the respective sides, and this combination can also cause an error.

In order to know the width of the passageway, it is necessary to associate the two side walls constituting the passageway with each other. In the case where the modeling is performed for each side, it is very difficult to associate the two walls with each other unless a connection region for connecting them (a floor or ceiling portion with respect to the two side walls of the passageway) is also modeled and combined together.

In the present technology, since the modeling of both sides can be performed at the same time, it is easy to associate one wall with the other wall, and those problems related to the combination and association $d_0$ not occur. Moreover, in general, errors easily occur in the line-of-sight direction in the estimation of the self-position (or distance) by the camera. Integrating the estimation results obtained by the cameras facing the opposite sides can be expected to provide the effect of improving the accuracy because the error of one of the cameras can be canceled as long as they $d_0$ not face the same side in error.

Other Embodiments

The present technology is not limited to the above-mentioned and various other embodiments can be realized.

Distance information regarding a distance between a plurality of target objects may be generated from images captured by three or more cameras. For example, three cameras may be used to calculate a distance or the like between two wall surfaces sandwiching a passageway. Alternatively, distance information between three or more target objects may be generated.

The present technology is not limited to the measurement of the passageway width, and may be used in other applications. For example, the present technology may be applied to size measurement of a predetermined device, size measurement of a housing space, and the like.

In the above description, the case where the first imaging device and the second imaging device are arranged for one apparatus has been described as an example. The present technology is not limited thereto, and the first imaging device and the second imaging device may be configured separately. Also in this case, the present technology can be applied by using, for example, information regarding the positional relationship between the first imaging device and the second imaging device as appropriate.

In a case where the first imaging device and the second imaging device are configured separately, devices and blocks for acquiring the scale information regarding the actual distance, such as the IMU (motion sensor), the pose measurement block, and the distance measurement sensor, may be each mounted on each imaging device.

For example, there is a case where the IMU (motion sensor) and the distance measurement sensor are arranged to be in a predetermined positional relationship with the first imaging device or there is a case where the IMU (motion sensor) and the distance measurement sensor are arranged to be in a predetermined positional relationship with the second imaging device. That is, the IMU (motion sensor) and the distance measurement sensor may be arranged to be in the predetermined positional relationship with only either the first imaging device or the second imaging device.

Hereinabove, the portable terminal has been exemplified as the embodiment of the information processing apparatus according to the present technology. However, the information processing apparatus according to the present technology may be realized by an arbitrary computer that is configured separately from the portable terminal and connected to a portable terminal with or without a wire. For example, the information processing method according to the present technology may be performed by cooperation of the portable terminal with another computer.

That is, the information processing method and the program according to the present technology can be executed not only in a computer system constituted by a single computer but also a computer system in which a plurality of computers operate in conjunction with each other. It should be noted that in the present disclosure, the system means a plurality of components (such as apparatuses and modules (parts)) and it does not matter whether all of the components are in the same casing. Therefore, a plurality of apparatuses housed in separate casings and connected to one another via a network and a single apparatus having a plurality of modules housed in a single casing are both the system.

Execution of the information processing method and the program according to the present technology by the computer system includes, for example, both a case where the acquisition of the scale information, the calculation of the first and second position information, the calculation of the distance information, the acquisition of the information regarding the device, the execution of the notification of the fact that it is the disadvantageous situation, and the like are performed by a single computer and a case where the respective processes are performed by different computers. Further, performing the respective processes by a predetermined computer includes causing another computer to perform some or all of those processes and obtaining results thereof.

That is, the information processing method and the program according to the present technology can also be applied to a cloud computing configuration in which a single function is shared and processed by a plurality of apparatuses cooperatively via a network.

The configurations of the information processing apparatus and the like, the flow of generation of the distance information, and the like described above with reference to the drawings belong to merely an embodiment, and can be arbitrarily modified without departing from the gist of the present technology. That is, any other configurations, algorithms, and the like for carrying out the present technology may be employed.

In the present disclosure, "equal", "the same", "90°", "180°", and the like are concepts including "substantially equal", "substantially the same", "substantially 90°", "substantially 180°", and the like. For example, the states included in a predetermined range (e.g., a range of ±10%) with reference to "completely equal", "completely the same", "completely 90°", "completely 180°", and the like are also included.

At least two of the features of the present technology described above can also be combined. In other words, various features described in the respective embodiments may be combined discretionarily irrespective of the embodiments. Moreover, the various effects described above are not limitative but are merely illustrative, and other effects may be provided.

It should be noted that the present technology can also take the following configurations.

(1) An information processing apparatus, including
an output control unit that outputs distance information based on an actual distance between a first target object imaged by a first imaging device and a second target object imaged by a second imaging device on the basis of scale information regarding the actual distance, first position information regarding a position and an attitude of the first imaging device, and second position information regarding a position and an attitude of the second imaging device.

(2) The information processing apparatus according to (1), in which
the first imaging device and the second imaging device are arranged to be in a predetermined positional relationship, and
the output control unit outputs the distance information on the basis of information regarding a positional relationship between the first imaging device and the second imaging device.

(3) The information processing apparatus according to (1) or (2), in which
the first imaging device is configured to have a first direction as an imaging direction, and the second imaging device is configured to have a second direction different from the first direction as an imaging direction.

(4) The information processing apparatus according to (3), in which
the first direction and the second direction are set such that an angle of intersection falls within a range of 90° to 180°.

(5) The information processing apparatus according to any one of (1) to (4), in which
the first position information is calculated on the basis of an image of the first target object imaged by the first imaging device, and
the second position information is calculated on the basis of an image of the second target object imaged by the second imaging device.

(6) The information processing apparatus according to any one of (1) to (5), in which
the scale information is acquired on the basis of a detection result of a motion sensor arranged to be in a predetermined positional relationship with at least one of the first imaging device or the second imaging device.

(7) The information processing apparatus according to (6), in which
the output control unit calculates at least one of the first position information or the second position information on the basis of the detection result of the motion sensor.

(8) The information processing apparatus according to any one of (1) to (7), in which
the scale information is acquired on the basis of an image obtained by imaging, by at least one of the first imaging device or the second imaging device, a known target object with which information regarding an actual distance is associated.

(9) The information processing apparatus according to any one of (1) to (8), in which
the scale information is acquired on the basis of a detection result of a distance measurement sensor arranged to be in a predetermined positional relationship with at least one of the first imaging device or the second imaging device.

(10) The information processing apparatus according to (9), in which
the output control unit calculates at least one of the first position information or the second position information on the basis of the detection result of the distance measurement sensor.

(11) The information processing apparatus according to any one of (1) to (10), in which
the first imaging device includes at least one configuration of the digital camera or a time of flight (ToF) sensor, and
the second imaging device includes at least one configuration of a digital camera or a ToF sensor.

(12) The information processing apparatus according to any one of (1) to (11), in which
the first target object and the second target object are wall surfaces arranged across a passageway, and
the distance information includes a width of the passageway.

(13) The information processing apparatus according to (12), further including:
a first surface;
a second surface on a side opposite to the first surface;
the first imaging device disposed toward a surface side of the first surface; and
the second imaging device disposed toward a surface side of the second surface, and
configured as a portable terminal portable by a user.

(14) The information processing apparatus according to any one of (1) to (13), further including
a device information acquisition unit that acquires information regarding a device mounted on the portable terminal, in which
the output control unit outputs the distance information on the basis of the information regarding the device.

(15) The information processing apparatus according to any one of (1) to (14), in which
the output control unit performs modeling of the first target object and the second target object on the basis of the scale information, the first position information, and the second position information, to thereby output the distance information.

(16) The information processing apparatus according to any one of (1) to (15), in which
the output control unit performs SLAM on the basis of an image of a first target object imaged by the first imaging device and an image of a second target object imaged by the second imaging device, to thereby output the distance information.

(17) The information processing apparatus according to any one of (1) to (16), further including
a notification unit that determines whether or not it is a situation disadvantageous to output of the distance information, and notifies, in a case where it is determined that it is the situation disadvantageous to the output of the distance information, a user of the fact.

(18) The information processing apparatus according to (17), in which
the notification unit notifies of information for overcoming the disadvantageous situation in a case where it is the situation disadvantageous to the output of the distance information.

(19) An information processing method, including
by a computer system,
outputting distance information based on an actual distance between a first target object imaged by a first imaging device and a second target object imaged by a second imaging device on the basis of scale information regarding the actual distance, first position information regarding a position and an attitude of the first imaging device, and second position information regarding a position and an attitude of the second imaging device.

(20) A program that causes a computer system to execute a step of outputting distance information based on an actual distance between a first target object imaged by a first imaging device and a second target object imaged by a second imaging device on the basis of scale information regarding the actual distance, first position information regarding a position and an attitude of the first imaging device, and second position information regarding a position and an attitude of the second imaging device.

REFERENCE SIGNS LIST 1 user
5 first imaging device
6 second imaging device
10 passageway
11 first wall surface
12 second wall surface 20 portable terminal
20a main surface
20b back surface
21 controller
32 storage unit
33 IMU
40, 41, 70 estimation block
42 integration unit
43 Kalman filter
44 three-dimensional re-configuration unit
55 pose estimation block
65 distance measurement sensor
100 distance information generation system

The invention claimed is:

1. An information processing apparatus, comprising
an output control unit that outputs distance information based on an actual distance between a first target object imaged by a first imaging device and a second target object imaged by a second imaging device on a basis of scale information regarding the actual distance, first position information regarding a position and an attitude of the first imaging device, and second position information regarding a position and an attitude of the second imaging device,
wherein the output control unit is implemented via at least one processor.

2. The information processing apparatus according to claim 1, wherein
the first imaging device and the second imaging device are arranged to be in a predetermined positional relationship, and
the output control unit outputs the distance information on a basis of information regarding a positional relationship between the first imaging device and the second imaging device.

3. The information processing apparatus according to claim 1, wherein
the first imaging device is configured to have a first direction as an imaging direction, and
the second imaging device is configured to have a second direction different from the first direction as an imaging direction.

4. The information processing apparatus according to claim 3, wherein
the first direction and the second direction are set such that an angle of intersection falls within a range of 90° to 180°.

5. The information processing apparatus according to claim 1, wherein
the first position information is calculated on a basis of an image of the first target object imaged by the first imaging device, and
the second position information is calculated on a basis of an image of the second target object imaged by the second imaging device.

6. The information processing apparatus according to claim 1, wherein
the scale information is acquired on a basis of a detection result of a motion sensor arranged to be in a predetermined positional relationship with at least one of the first imaging device or the second imaging device.

7. The information processing apparatus according to claim 6, wherein
the output control unit calculates at least one of the first position information or the second position information on a basis of the detection result of the motion sensor.

8. The information processing apparatus according to claim 1, wherein
the scale information is acquired on a basis of an image obtained by imaging, by at least one of the first imaging device or the second imaging device, a known target object with which information regarding an actual distance is associated.

9. The information processing apparatus according to claim 1, wherein
the scale information is acquired on a basis of a detection result of a distance measurement sensor arranged to be in a predetermined positional relationship with at least one of the first imaging device or the second imaging device.

10. The information processing apparatus according to claim 9, wherein
the output control unit calculates at least one of the first position information or the second position information on a basis of the detection result of the distance measurement sensor.

11. The information processing apparatus according to claim 1, wherein
the first imaging device includes at least one configuration of the digital camera or a time of flight sensor, and
the second imaging device includes at least one configuration of a digital camera or a time of flight sensor.

12. The information processing apparatus according to claim 1, wherein
the first target object and the second target object are wall surfaces arranged across a passageway, and
the distance information includes a width of the passageway.

13. The information processing apparatus according to claim 12, further comprising:
a first surface;
a second surface on a side opposite to the first surface;
the first imaging device disposed toward a surface side of the first surface; and
the second imaging device disposed toward a surface side of the second surface, and
configured as a portable terminal portable by a user.

14. The information processing apparatus according to claim 1, further comprising
a device information acquisition unit that acquires information regarding a device mounted on the portable terminal, wherein
the output control unit outputs the distance information on a basis of the information regarding the device, and
the device information acquisition unit is implemented via at least one processor.

15. The information processing apparatus according to claim 1, wherein
the output control unit performs modeling of the first target object and the second target object on a basis of the scale information, the first position information, and the second position information, to thereby output the distance information.

16. The information processing apparatus according to claim 1, wherein
the output control unit performs simultaneous localization and mapping on a basis of an image of a first target object imaged by the first imaging device and an image of a second target object imaged by the second imaging device, to thereby output the distance information.

17. The information processing apparatus according to claim 1, further comprising a notification unit that determines whether or not it is a situation disadvantageous to output of the distance information, and notifies, in a case where it is determined that it is the situation disadvantageous to the output of the distance information, a user of the fact.

18. The information processing apparatus according to claim 17, wherein
the notification unit notifies of information for overcoming the disadvantageous situation in a case where it is the situation disadvantageous to the output of the distance information.

19. An information processing method performed by a computer system, the method comprising
outputting distance information based on an actual distance between a first target object imaged by a first imaging device and a second target object imaged by a second imaging device on a basis of scale information regarding the actual distance, first position information regarding a position and an attitude of the first imaging device, and second position information regarding a position and an attitude of the second imaging device.

20. A non-transitory computer-readable medium having embodied thereon a program, which when executed by a computer system causes the computer system to execute a method, the method comprising:
outputting distance information based on an actual distance between a first target object imaged by a first imaging device and a second target object imaged by a second imaging device on a basis of scale information regarding the actual distance, first position information regarding a position and an attitude of the first imaging device, and second position information regarding a position and an attitude of the second imaging device.

* * * * *